United States Patent
Seo et al.

(10) Patent No.: US 10,706,847 B2
(45) Date of Patent: Jul. 7, 2020

(54) METHOD FOR OPERATING SPEECH RECOGNITION SERVICE AND ELECTRONIC DEVICE SUPPORTING THE SAME

(71) Applicant: SAMSUNG ELECTRONICS CO., LTD., Suwon-si, Gyeonggi-do (KR)

(72) Inventors: Jang Seok Seo, Suwon-si (KR); Sang Ki Kang, Suwon-si (KR); Han Jun Ku, Suwon-si (KR); Sung Pa Park, Seoul (KR); In Jong Rhee, Seongnam-si (KR); Ji Soo Yi, Seoul (KR); Yoo Jin Hong, Seongnam-si (KR); Kyung Tae Kim, Hwaseong-si (KR); Ji Hyun Kim, Yongin-si (KR); Yong Joon Jeon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 140 days.

(21) Appl. No.: 15/938,094

(22) Filed: Mar. 28, 2018

(65) Prior Publication Data

US 2018/0286400 A1   Oct. 4, 2018

(30) Foreign Application Priority Data

Mar. 28, 2017 (KR) .................. 10-2017-0039590

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/1815* (2013.01);
(Continued)

(58) Field of Classification Search
CPC ...................................................... G10L 15/22
(Continued)

(56) References Cited

U.S. PATENT DOCUMENTS

| 5,224,151 A | 6/1993 | Bowen et al. |
| 5,802,533 A * | 9/1998 | Walker .................. G06F 17/211 |
| | | 715/201 |

(Continued)

FOREIGN PATENT DOCUMENTS

| KR | 10-2001-0010527 | 2/2001 |
| KR | 10-2011-0065164 | 6/2011 |

OTHER PUBLICATIONS

Search Report dated Jun. 26, 2018 in counterpart International Patent Application No. PCT/KR2018/003605.
(Continued)

*Primary Examiner* — Susan I McFadden
(74) *Attorney, Agent, or Firm* — Nixon & Vanderhye P.C.

(57) ABSTRACT

An electronic device includes a communication module, a sensor module, a microphone, a memory, a display, and a processor. The processor is configured to determine whether a user is in proximity to the electronic device, to transmit at least one of voice input information or information on the proximity of the user to the external device, to receive at least one action associated with the execution of the function of the electronic device corresponding to a recognition result from the external device, based on voice input recognition of the external device, to output content associated with execution and/or processing of each of the at least one action, when the user is spaced apart from the electronic device, and to prevent at least a portion of the at least one content from being output in a state that the user is within the specified proximity to the electronic device.

20 Claims, 17 Drawing Sheets

(51) Int. Cl.
*G10L 15/18* (2013.01)
*G10L 15/30* (2013.01)

(52) U.S. Cl.
CPC ........ *G10L 15/30* (2013.01); *G10L 2015/223* (2013.01); *G10L 2015/226* (2013.01)

(58) Field of Classification Search
USPC ........................................................ 704/257
See application file for complete search history.

(56) References Cited

U.S. PATENT DOCUMENTS

| | | | |
|---|---|---|---|
| 7,076,675 | B2 | 7/2006 | Martinez Perez et al. |
| 7,113,811 | B2 | 9/2006 | Goris et al. |
| 7,143,035 | B2 | 11/2006 | Dharanipragada et al. |
| 7,319,889 | B2 | 1/2008 | Goris et al. |
| 7,542,901 | B2 | 6/2009 | Dharanipragada et al. |
| 7,853,449 | B2 | 12/2010 | Dharanipragada et al. |
| 8,057,233 | B2 * | 11/2011 | Owen ...................... G09B 5/06 172/176 |
| 8,204,554 | B2 | 6/2012 | Goris et al. |
| 8,483,780 | B2 | 7/2013 | Goris et al. |
| 9,196,239 | B1 | 11/2015 | Taylor et al. |
| 9,711,142 | B2 | 7/2017 | Choi |
| 9,928,837 | B2 | 3/2018 | Choi |
| 9,984,684 | B1 * | 5/2018 | Uszkoreit ............ G10L 15/1822 |
| 10,191,718 | B2 * | 1/2019 | Rhee .................... G06F 3/04817 |
| 10,257,057 | B2 * | 4/2019 | Bhave ................. G06F 11/3006 |
| 2003/0187648 | A1 | 10/2003 | Dharanipragada et al. |
| 2004/0225904 | A1 | 11/2004 | Perez et al. |
| 2005/0003793 | A1 | 1/2005 | Goris et al. |
| 2006/0293901 | A1 | 12/2006 | Dharanipragada et al. |
| 2007/0004470 | A1 | 1/2007 | Goris et al. |
| 2008/0070639 | A1 | 3/2008 | Goris et al. |
| 2008/0215329 | A1 | 9/2008 | Dharanipragada et al. |
| 2011/0093271 | A1 | 4/2011 | Bernard |
| 2011/0136481 | A1 | 6/2011 | Park et al. |
| 2012/0036121 | A1 | 2/2012 | Jitkoff et al. |
| 2012/0238327 | A1 | 9/2012 | Goris et al. |
| 2014/0195252 | A1 | 7/2014 | Gruber et al. |
| 2014/0359523 | A1 | 12/2014 | Jang |
| 2016/0070342 | A1 | 3/2016 | Taylor et al. |
| 2017/0025122 | A1 | 1/2017 | Choi |
| 2017/0278516 | A1 | 9/2017 | Choi |

OTHER PUBLICATIONS

Written Opinion dated Jun. 26, 2018 in counterpart International Patent Application No. PCT/KR2018/003605.
European Search Report dated Jan. 24, 2020 for EP Application No. 18777326.2.

* cited by examiner

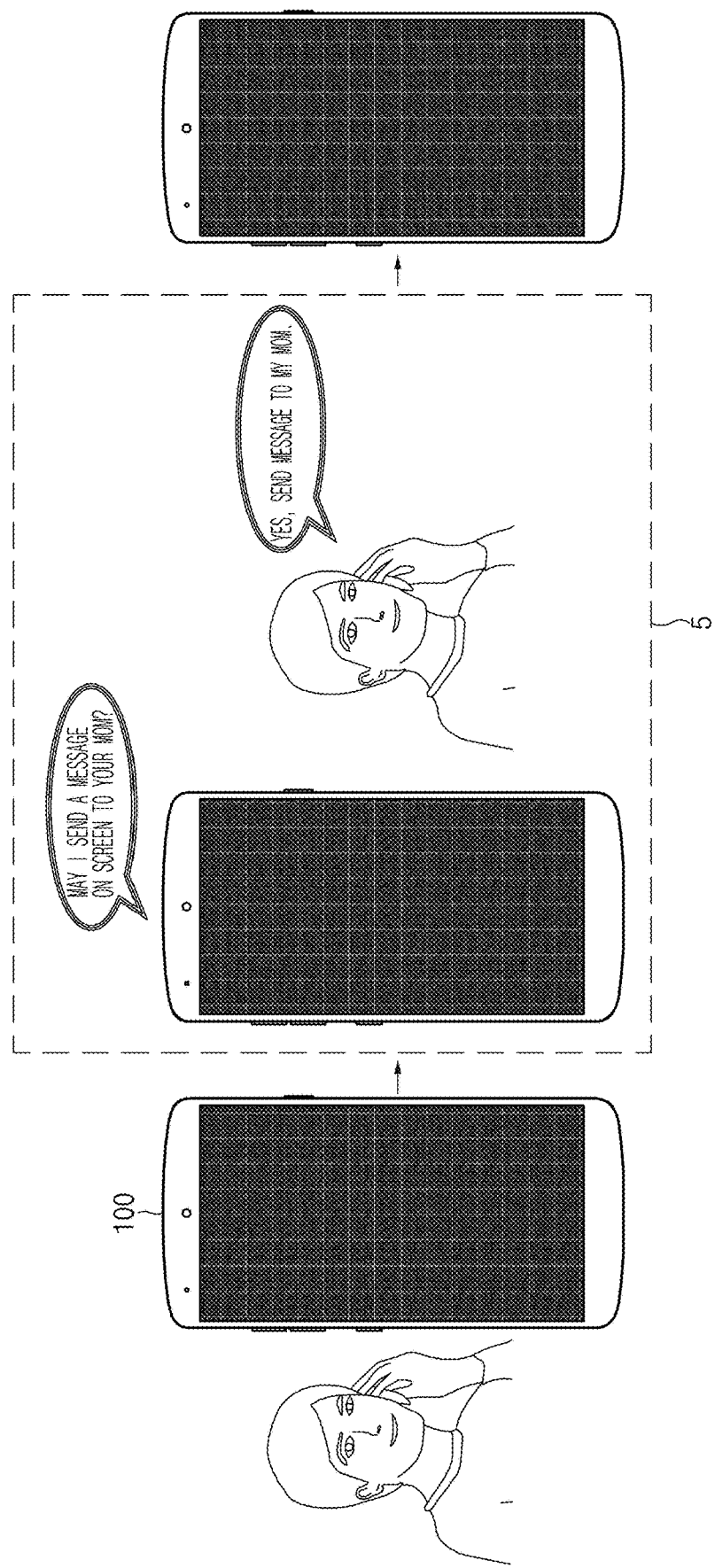

METHOD FOR OPERATING SPEECH RECOGNITION SERVICE AND ELECTRONIC DEVICE SUPPORTING THE SAME

CROSS-REFERENCE TO RELATED APPLICATION

This application is based on and claims priority under 35 U.S.C. § 119 to Korean Patent Application No. 10-2017-0039590, filed on Mar. 28, 2017, in the Korean Intellectual Property Office, the disclosure of which is incorporated by reference herein its entirety.

BACKGROUND

1. Field

The present disclosure relates to a technology for operating a speech recognition service.

2. Description of Related Art

Recently, electronic devices have employed various input manners for the interaction with a user. For example, the electronic device may support a voice input manner of receiving voice data uttered by a user, based on executing a specified application. Further, the electronic device may support a speech recognition service of recognizing the received voice data, of deriving the speech intent of the user from the recognized voice data, and of performing an operation corresponding to the derived speech intent.

The support or the operation of the speech recognition service may be implemented based on an artificial intelligence (AI) system. The AI system, which is a computer system for implementing human-level intelligence, is a system allowing machine to train itself and to make a judgment for itself and having a recognition rate more improved as the use of the AI system is increased. The AI technology may include a machine learning (deep learning) technique employing an algorithm allowing machine to classify/train features of input data for itself and element techniques (e.g., linguistic understanding techniques for recognizing human language/characters and interference/prediction techniques for logically determining, interfering, and predicting information) of simulating the recognition and judgment of a human brain by utilizing a machine algorithm.

The electronic device may operate based on the speech intent of the user while outputting audiovisual content including processing information of the operation. However, when a user intends to use only auditory information or fails to see a display depending on the operation environment of the electronic device, outputting the visual content may be meaningless in the interaction between the user and the electronic device.

SUMMARY

The present disclosure addresses at least the above-mentioned problems and/or disadvantages and provides at least the advantages described below. Accordingly, an aspect of the present disclosure is to provide a method for operating a speech recognition service and an electronic device supporting the same, capable of providing the speech recognition service depending on the operating state of the electronic device, based on the proximity between the electronic device and a user.

In accordance with an aspect of the present disclosure, an electronic device supporting a speech recognition service may include a communication module comprising communication circuitry configured to communicate with at least one external device, a sensor module comprising sensing circuitry configured to sense a proximity of an object to the electronic device, a microphone configured to receive a voice input, a memory configured to store information associated with operation of the speech recognition service, a display configured to output a screen associated with execution of a function of the electronic device, and a processor electrically connected with the communication module, the sensor module, the microphone, the memory, and the display.

In accordance with another aspect of the present disclosure, the processor may determine whether the electronic device and a user are in proximity to each other using the sensor module, transmit at least one of voice input information and/or information on the proximity of the user to the external device, receive at least one action which is associated with the execution of the function of the electronic device, corresponding to a recognition result from the external device, based on voice input recognition of the external device, output at least one content associated with execution or processing of each of the at least one action, when the user is spaced apart from (outside a predetermined proximity) the electronic device, and prevent at least a portion of the at least one content from being output in a state that the electronic device and the user are in the proximity to each other.

As described above, according to various embodiments, the speech recognition service may be provided depending on the operating state of the electronic device, based on whether the electronic device and the user are in the proximity to each other.

According to various embodiments, visual content is prevented from being output when the speech recognition service is used, depending on the operation state of the electronic device, thereby saving power consumption of the electronic device.

Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 5C is a diagram illustrating another operation of the speech recognition service for the second situation of the user terminal operated with the proximity function, according to an embodiment;

In the following description made with respect to the accompanying drawings, the same elements or similar elements may be assigned with the same reference numerals or similar reference numerals.

DETAILED DESCRIPTION

Figure 1:
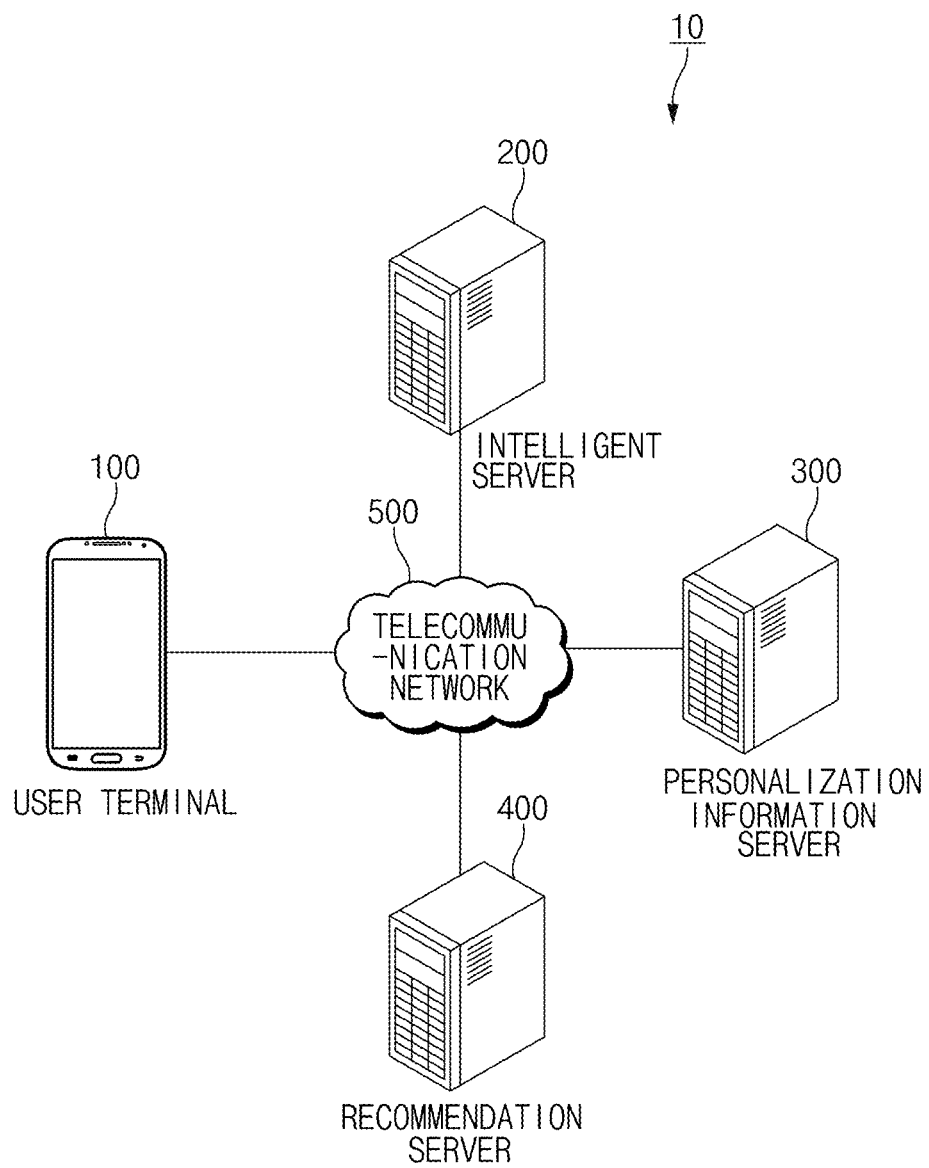
FIG. 1 is a diagram illustrating an integrated intelligence system, according to an embodiment.

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to their dictionary definitions, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude additional functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may be used to modify various different elements of various embodiments of the present disclosure, but are not intended to limit the elements. For instance, "a first user device" and "a second user device" may indicate different users regardless of order or importance. For example, a first component may be referred to as a second component and vice versa without departing from the scope of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may refer, for example, and without limitation, to a dedicated processor (for example, an embedded processor) for performing a corresponding operation, a general purpose processor (for example, a central processing unit (CPU), an application processor (AP)) for performing corresponding operations by executing at least one software program stored in a memory device, or the like.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device, or the like, but is not limited thereto. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit), or the like, but is not limited thereto.

In various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame, or the like, but is not limited thereto.

In various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Prior to describing various embodiments of the present disclosure, an integrated intelligent system to which various embodiments of the present disclosure is capable of being applied will be described with reference to FIGS. 1, and 2A, 2B, 2C and 2D.

FIG. 1 is a diagram illustrating an integrated intelligence system, according to an embodiment.

Referring to FIG. 1, an integrated intelligent system 10 may include a user terminal 100, an intelligent server 200, a personal information server 300, or a recommendation server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may be the user terminal 100. According to an embodiment, the user terminal 100 may receive user utterance as a user input. The user terminal 100 may receive the user utterance and may generate an instruction for operating an app based on the user utterance. As such, the user terminal 100 may operate the app using the instruction.

An intelligent server 200 may receive a user voice input from a user terminal 100 via a telecommunication network (e.g., a communication network) and may convert the user voice input into text data. According to another embodiment, the intelligent server 200 may create (or select) a path rule based on the text data. The path rule may include information on an action (or an operation) for performing a function of an application (app) or information on a parameter necessary for performing the action. In addition, the path rule may include the sequence of actions for the app. For example, the path rule may include at least one unit action arranged in a series of sequences to execute a specific app step by step.

The user terminal 100 may receive the path rule, may select an app depending on the path rule, and may execute an action included in the path rule in the selected app. For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action among a plurality of actions, in the display. For another example, the user terminal 100 may display the result obtained by executing the action in the display, in response to the user input.

A personal information server 300 may include user information or a database in which information about a user terminal 100 is stored. For example, the personal information server 300 may receive the user information (e.g., context information, name information, age information, gender information, address information, occupation information, health information, financial information, user preference information or the like) from the user terminal 100 to store the user information in the database. The personal information server 300 may receive usage information (e.g., app installation information, app execution information, call information, battery information, location information, or communication information) of the user terminal 100 from the user terminal 100 to store the usage information in the database. In an embodiment, in the case where the personal information server 300 verifies information received from the user terminal 100 or information pre-stored in the database, the personal information server 300 may update the database. An intelligent server 200 may be used to receive the user information or information of the user terminal 100 from the personal information server 300 over the telecommunication network and to generate a path rule associated with the user input. According to an embodiment, the user terminal 100 may receive the user information from the personal information server 300 over the telecommunication network, and may use the user information as information for managing the database.

The recommendation server 400 may include a database storing information about a function in a terminal, introduction of an application, or a function to be provided. For example, the recommendation server 400 may include a database associated with a function that a user utilizes by receiving the user information of the user terminal 100 from the personal information server 300. The user terminal 100 may receive information about the function to be provided from the recommendation server 400 over the telecommunication network and may provide the received information to the user.

Figure 2A:
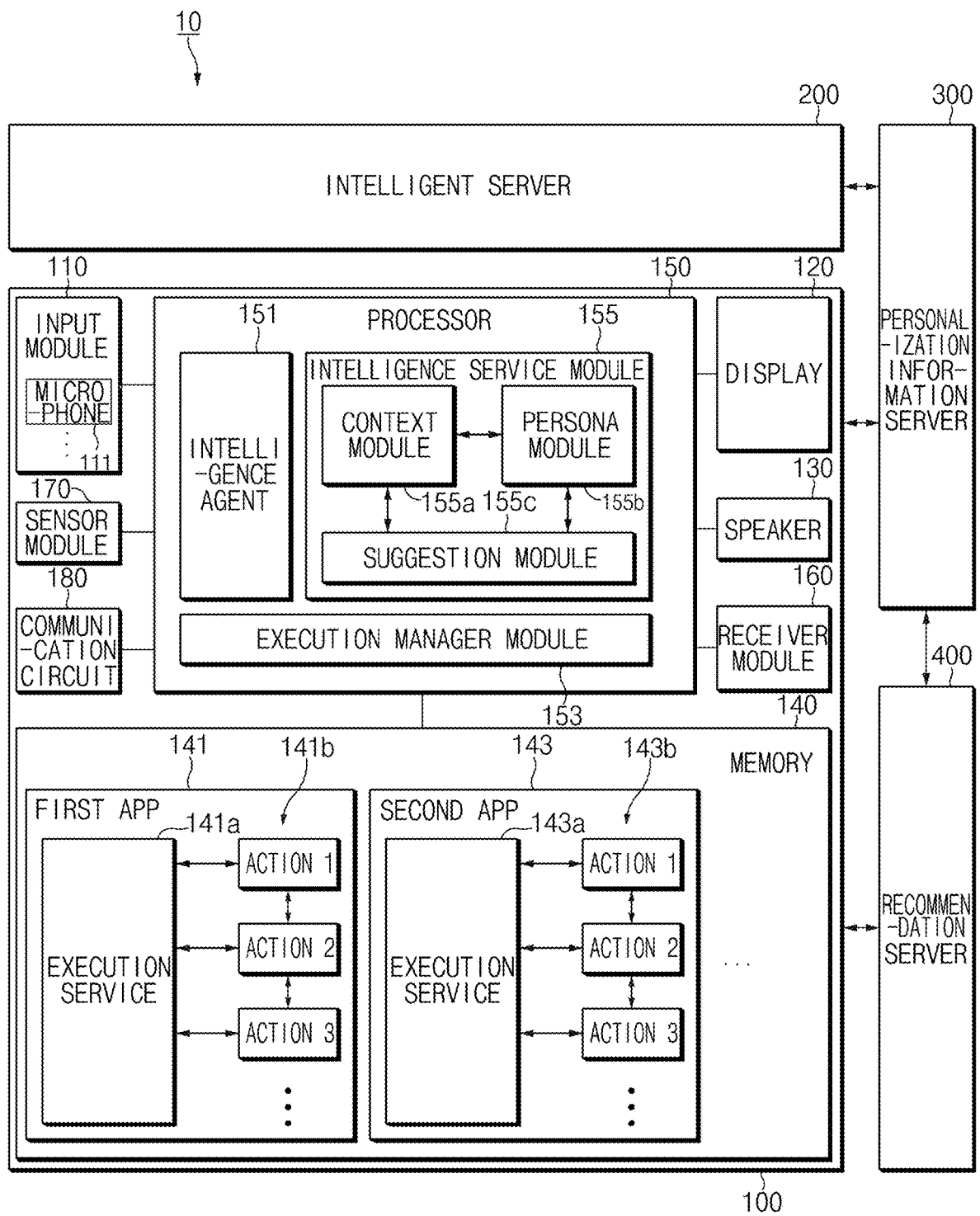
FIG. 2A is a block diagram illustrating a user terminal of the integrated intelligence system, according to an embodiment.

FIG. 2A is a block diagram illustrating a user terminal of the integrated intelligence system, according to an embodiment.

Referring to FIG. 2A, the user terminal 100 may include an input module (e.g., including input circuitry) 110, a display 120, a speaker 130, a memory 140, a processor (e.g., including processing circuitry) 150, a receiver module (e.g., including receiver/receiving circuitry) 160, a sensor module 170, and/or a communication module (e.g., including communication circuitry) 180. At least some elements (e.g., reference numerals 110, 120, 130, 140, 160, 170, or 180) of the user terminal 100 may be electrically or operatively connected with the processor 150.

According to various embodiments, the user terminal 100 may not include at least one of the above-described elements or may further include other element(s). For example, the user terminal 100 may include a housing, and the elements of the user terminal 100 may be included inside the housing or may be provided on the housing. According to an embodiment, the housing may include a first surface (e.g., a top surface), a second surface (e.g., a bottom surface) opposite to the first surface, and at least one third surface (e.g., a side surface) connecting the first surface with the second surface.

Figure 7:
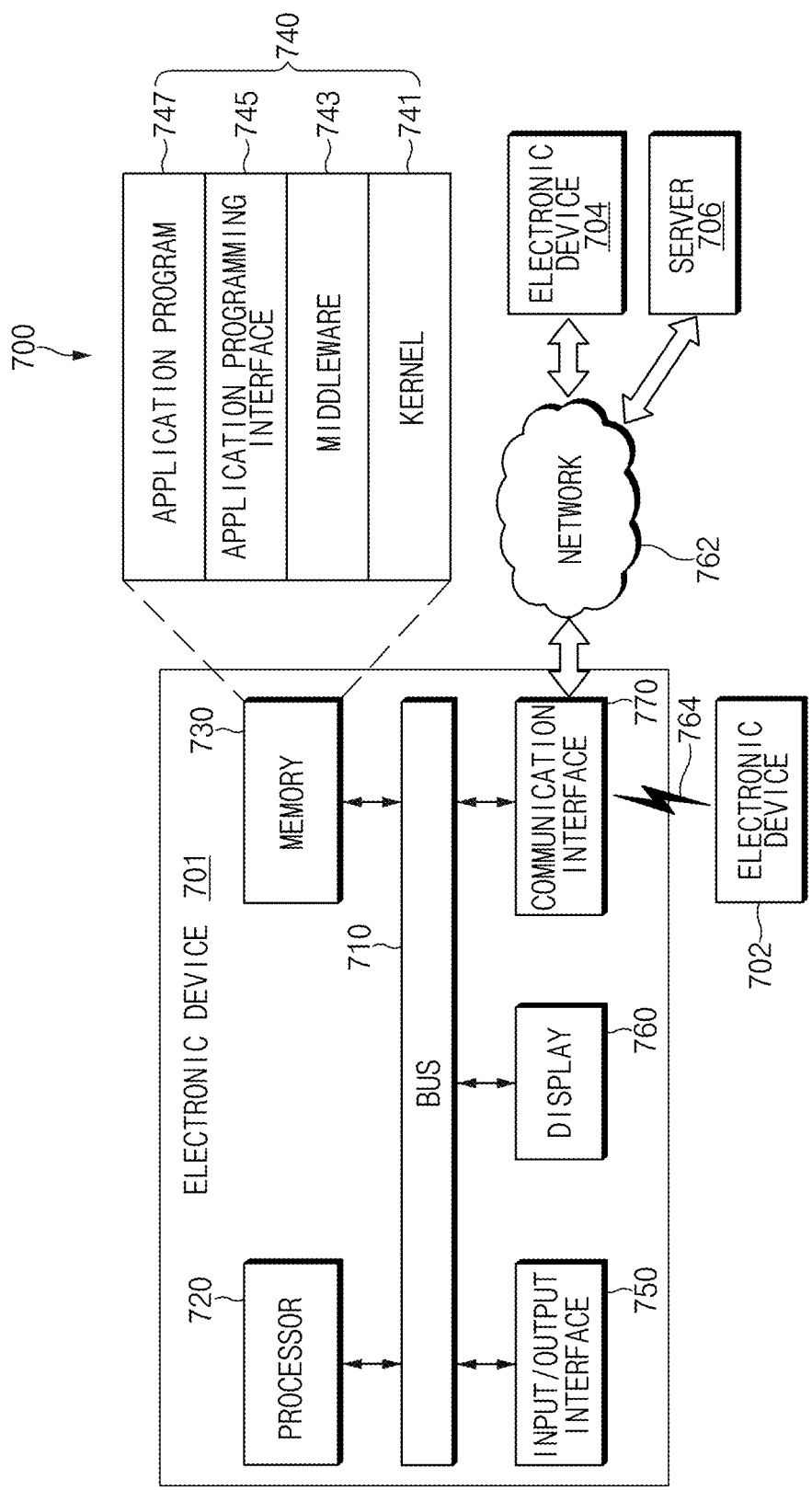
FIG. 7 is a diagram illustrating an electronic device in a network environment, according to an embodiment.
Figure 8:
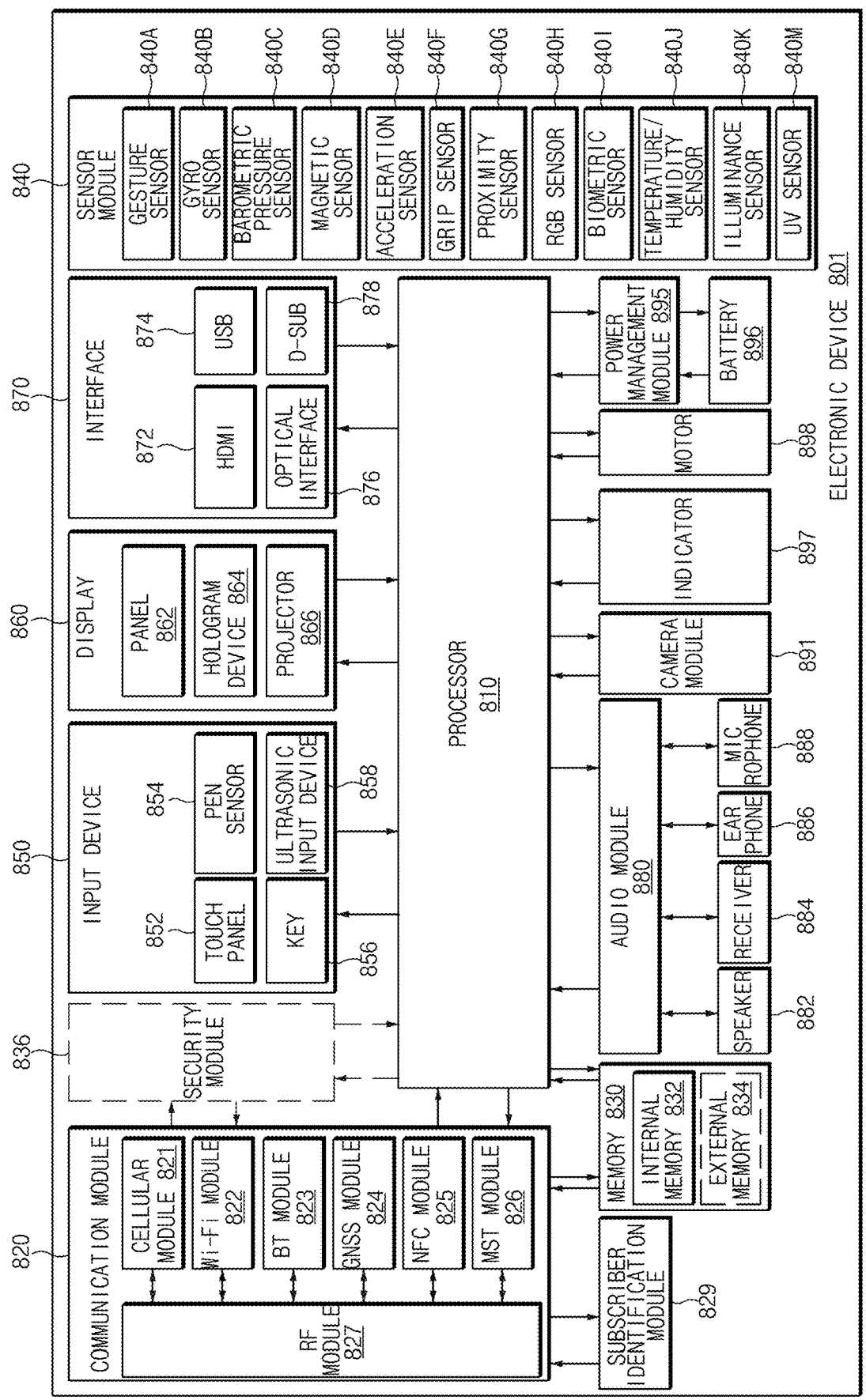
FIG. 8 is a block diagram illustrating the electronic device, according to an embodiment.

According to various embodiments, the user terminal 100 may be referred to, for example, as an electronic device and may include an element of an electronic device 701 illustrated in FIG. 7 or an element of an electronic device 801 illustrated in FIG. 8.

According to an embodiment, the input module 110 may include various input circuitry and receive a user input from a user. For example, the input module 110 may receive a user input from an external device (e.g., a keyboard or a headset) connected with the input module 110. For another example, the input module 110 may include a touch screen (e.g., a touch screen display) coupled to the display 120. For another example, the input module 110 may include a hardware key (or a physical key) positioned in the user terminal 100 (or the housing of the user terminal 100). According to an embodiment, the input module 110 may include a microphone 111 which may receive a user utterance as a voice signal. For example, the input module 110 may include a speech input system and may receive the user utterance as the voice signal through the speech input system. According to an embodiment, to receive the input resulting from the user utterance, the microphone 111 may be controlled in the state (e.g., always on) that the microphone 111 is always driven or may be driven when a user manipulation is applied to a hardware key (e.g., reference number 112 of FIG. 2B) provided in one region of the user terminal 100.

According to an embodiment, the display 120 may display an image, a video, and/or the execution screen of an app. For example, the display 120 may display a graphic user interface (GUI) of an app. According to an embodiment, the display 120 may be implemented with a touch screen display having at least a part exposed through the first surface of the housing and having the form coupled to a touch screen.

According to an embodiment, the speaker 130 or the receiver module (e.g., including various receiver circuitry) 160 may output a voice signal. For example, the speaker 130 or the receiver module 160 may output a voice signal generated inside the user terminal 100 or a voice signal received from an external device.

According to an embodiment, the memory 140 may store a plurality of apps 141 and 143. The apps 141 and 143 stored in the memory 140 may be selected, executed, and operated depending on user inputs. The apps 141 and 143 may include, for example, an app (e.g., a photo app, a music app, a calendar app, a messaging app, a calling app, or the like) to support performing the function of the user terminal 100.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141a and 143a performing a function or a plurality of actions (or unit actions) 141b and 143b. The execution services 141a and 143a may be generated by the execution manager module 153 of the processor 150 and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not input).

According to an embodiment, the execution services 141a and 143a may execute the actions 141b and 143b depending on a path rule. For example, the execution services 141a and 143a may be activated by the execution manager module 153, may receive an execution request from the execution manager module 153 depending on the path rule, and may execute the actions 141b and 143b of the apps 141 and 143 depending on the execution request. If the execution of the actions 141b and 143b is completed, the execution services 141a and 143a may transmit completion information to the execution manager module 153.

According to an embodiment, in the case where the plurality of the actions 141b and 143b are respectively executed in the apps 141 and 143, the plurality of the actions 141b and 143b may be sequentially executed. If the execution of one action (action 1) is completed, the execution services 141a and 143a may open the next action (action 2) and may transmit completion information to the execution manager module 153. Here, it is understood that opening an arbitrary action is to change a state of the arbitrary action to an executable state or to prepare the execution of the arbitrary action. In other words, if the arbitrary action is not opened, the corresponding action may be not executed. If the completion information is received, the execution manager module 153 may transmit an execution request for the next actions 141b and 143b to an execution service (e.g., action 2). According to an embodiment, in the case where the plurality of apps 141 and 143 are executed, the plurality of apps 141 and 143 may be sequentially executed. For example, if receiving the completion information after the execution of the last action of the first app 141 is executed, the execution manager module 153 may transmit the execution request of the first action of the second app 143 to the execution service 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touch screen, or a specific voice input) input through the input module 110.

According to an embodiment, the processor 150 may include various processing circuitry and/or program elements that control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include various program elements including, for example, the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the present disclosure may be implemented by hardware or by software. In various embodiments of the present disclosure, it is understood that the action executed by the intelligence agent 151, the execution manager module 153, or the intelligence service module 155 is an action executed by the processor 150.

According to an embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140.

The intelligence agent 151 may transmit and process the user input received through the input module 110 to the intelligent server 200. According to an embodiment, before transmitting the user input to the intelligent server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment, an intelligence agent 151 may include a wakeup recognition module recognizing a call of a user. The wakeup recognition module may recognize a wakeup instruction of the user through the speech recognition module. In the case where the wakeup recognition module receives the wakeup instruction, the wakeup recognition module may activate the intelligence agent 151 to receive the user input. According to an embodiment, the wakeup recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed.

According to an embodiment, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligent server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input using an algorithm for recognizing a voice. For example, the algorithm for recognizing the voice may be at least one of a hidden markov model (HMM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may transmit the voice of the user to the intelligent server 200 to receive the changed text data. As such, the intelligence agent 151 may display the text data in the display 120.

According to an embodiment, the intelligence agent 151 may receive a path rule from the intelligent server 200. According to an embodiment, the intelligence agent 151 may transmit the path rule to the execution manager module 153.

According to an embodiment, the intelligence agent 151 may transmit the execution result log according to the path rule received from the intelligent server 200 to the intelligence service module 155, and the transmitted execution result log may be accumulated and managed in preference information of the user of a persona module 155b.

According to an embodiment, the execution manager module 153 may receive the path rule from the intelligence agent 151 to execute the apps 141 and 143 and may allow the apps 141 and 143 to execute the actions 141b and 143b included in the path rule. For example, the execution manager module 153 may transmit instruction information for executing the actions 141b and 143b to the apps 141 and 143 and may receive completion information of the actions 141b and 143b from the apps 141 and 143.

According to an embodiment, the execution manager module 153 may transmit or receive the instruction information for executing the actions 141b and 143b of the apps 141 and 143 between the intelligence agent 151 and the apps 141 and 143. The execution manager module 153 may bind the apps 141 and 143 to be executed depending on the path rule and may transmit the instruction information of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to an embodiment, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing (e.g., in the case where a parameter necessary for the actions 141b and 143b are not input), the execution manager module 153 may transmit information about the partial landing to the intelligence agent 151. The intelligence agent 151 may make a request for an input of necessary information (e.g., parameter information) to the user using the received information. For another example, in the case where the execution state of the actions 141b and 143b are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligent server 200 and may transmit the received parameter information to the execution manager module 153. The execution manager module 153 may change a parameter of each of the actions 141b and 143b to a new parameter using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies the app 141 executing a part of the action 141b but does not specify the app 143 executing any other action 143b, the execution manager module 153 may receive a plurality of different path rules in which the same app 141 (e.g., a gallery app) executing the part of the action 141b is executed and in which different apps 143 (e.g., a message app or a Telegram app) executing the other action 143b. For example, the execution manager module 153 may execute the same actions 141b and 143b (e.g., the same successive actions 141b and 143b) of the plurality of path rules. In the case where the execution manager module 153 executes the same action, the execution manager module 153 may display a state screen for selecting the different apps 141 and 143 included in the plurality of path rules in the display 120.

According to an embodiment, an intelligence service module 155 may be used to process an input, e.g., a user input, by managing information of a user and the information on the operation of the user terminal 100. According to an embodiment, the intelligence service module 155 may include a context module 155a, a persona module 155b, and/or a suggestion module 155c.

The context module 155a may collect present states of the apps 141 and 143 from the apps 141 and 143. For example, the context module 155a may collect the present states of the apps 141 and 143 by receiving context information representing the present states of the apps 141 and 143. The context module 155a may collect the operation state of the user terminal 100. For example, the context module 155a may collect sensing information (e.g., the information on the proximity between the user terminal 100 and the user) from the sensor module 170 to be described later, and may transmit the sensing information to an intelligent agent 151.

The persona module 155b may manage the personal information of a user who uses the user terminal 100. For example, the persona module 155b may manage the personal information of the user by collecting the use information and an operation result of the user terminal 100.

The suggestion module 155c may recommend a command to the user by predicting the intent of the user. For example, the suggestion module 155c may recommend a command to the user by considering a present state (e.g., a time, place, situation, or app) of the user.

According to an embodiment, the sensor module 170 may include various sensors and/or sensing circuitry including, for example, and without limitation, a proximity sensor. The sensor module 170 may sense an object (e.g., a user) in the proximity to the user terminal 100 within a specific distance from the user terminal 100 and may transmit the sensing information to the context module 155a.

According to an embodiment, the communication module 180 (or a communication circuit) may establish wired communication or wireless communication with at least one external device (e.g., the intelligent server 200, a personalization information server 300, or a recommendation server 400) over an integrated intelligence system 10, based on a specified protocol. The communication module 180 may transceive at least one piece of information associated with the operation of the speech recognition service, based on the wired communication or the wireless communication.

Figure 2B:
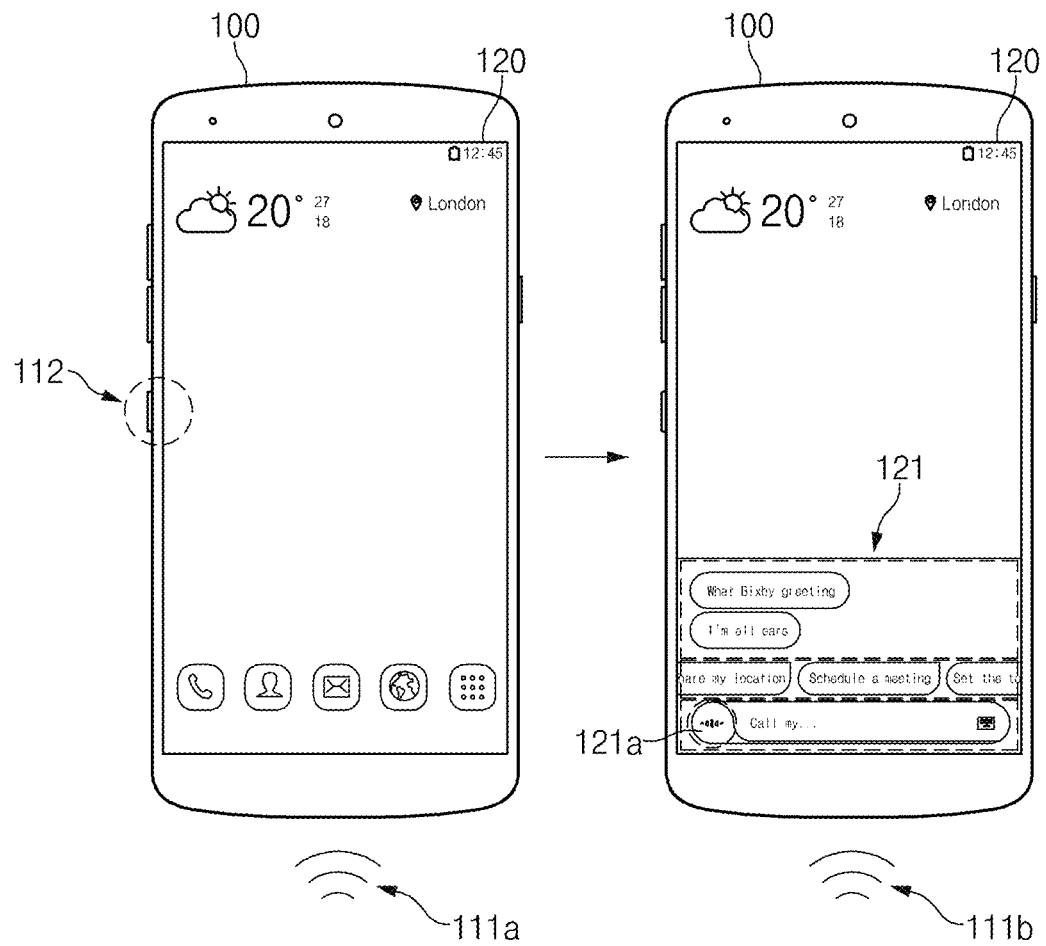
FIG. 2B is a diagram illustrating that an intelligence application of the user terminal is executed, according to an embodiment.

FIG. 2B is a diagram illustrating that an intelligence application of the user terminal is executed, according to an embodiment.

Referring to FIG. 2B, the user terminal 100 may receive the user input and may execute an intelligent app (e.g., a speech recognition app) performed together with the intelligent agent 151.

According to an embodiment, the user terminal 100 may execute the intelligent app for recognizing the voice through a hardware key 112. For example, the user terminal 100 may display a user interface (UI) 121 of the intelligent app on the display 120 when the user input is received through the hardware key 112. For example, the user may touch a speech recognition button 121a of the UI 121 of an intelligent app to input a voice 111b in the state that the UI 121 of the intelligent app is displayed on the display 120. For another example, the user may input the voice 111b by continuously pressing the hardware key 112 to input the speech 111b.

According to an embodiment, the user terminal 100 may execute the intelligent app for recognizing a voice through the microphone 111 (illustrated in FIG. 2A). For example, the user terminal 100 may display the UI 121 of the intelligent app on the display 120 when a specific voice 111a (e.g., wake up!) is input through the microphone 111. In this connection, the above-described wake-up recognition module may activate an intelligent agent (see reference number 151 of FIG. 2A) corresponding to a specified voice input. The intelligent agent 151 is activated with the execution of the intelligent app internetworking with the intelligent agent 151. In addition, the intelligent app may be executed with the activation of an intelligent assistant (e.g., Bixby) interacting (conversation) with the user based on a specific interface (e.g., a dialogue interface).

Figure 2C:
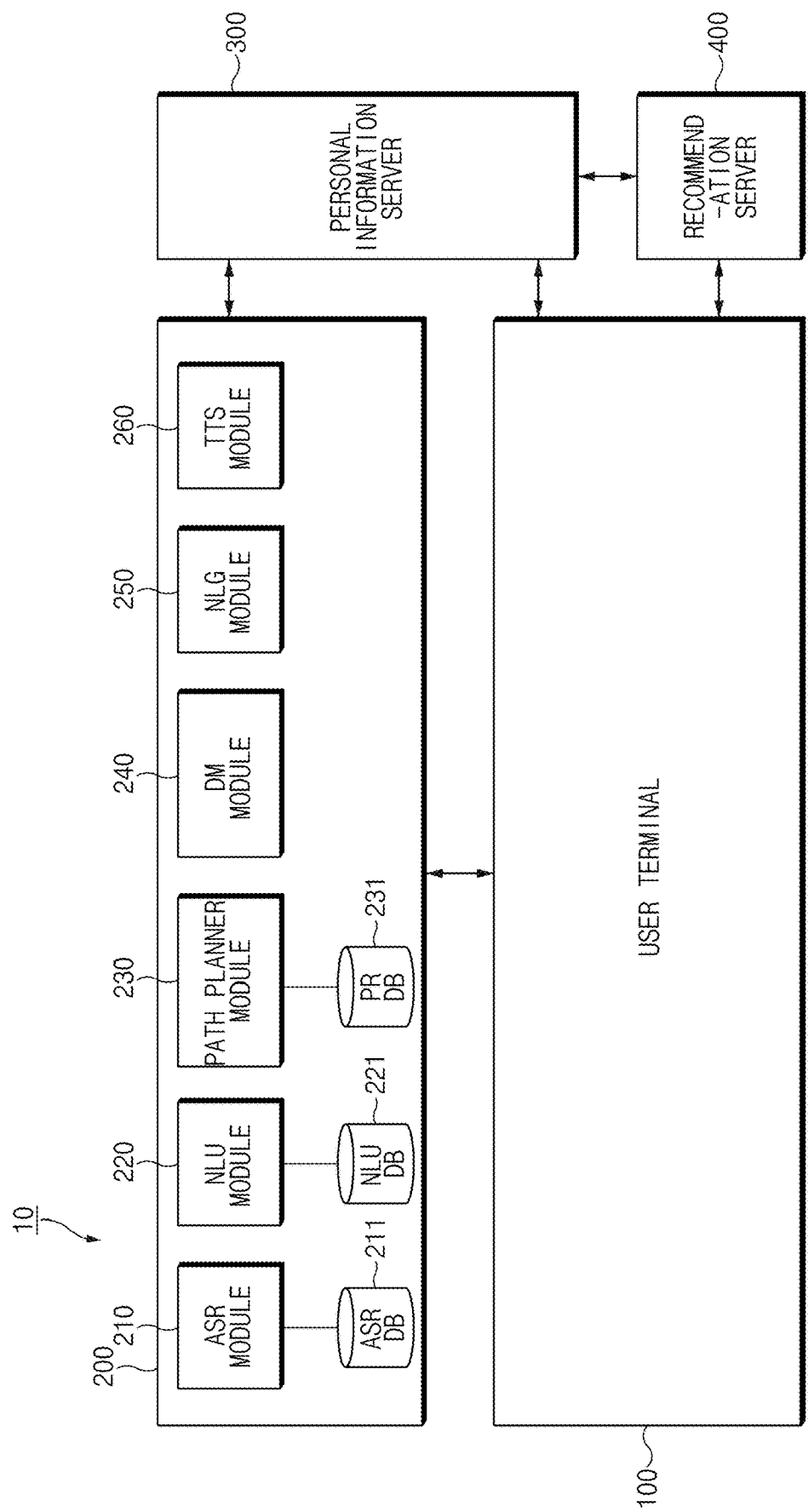
FIG. 2C is a block diagram illustrating an intelligent server of the integrated intelligence system, according to an embodiment.

FIG. 2C is a block diagram illustrating an intelligent server of the integrated intelligence system, according to an embodiment.

Referring to FIG. 2C, the intelligent server 200 may include an automatic speech recognition (ASR) module (e.g., including processing circuitry and/or program elements) 210, a natural language understanding (NLU) module (e.g., including processing circuitry and/or program elements) 220, a path planner module (e.g., including processing circuitry and/or program elements) 230, a dialogue management (DM) module (e.g., including processing circuitry and/or program elements) 240, a natural language generator (NLG) module (e.g., including processing circuitry and/or program elements) 250, or a text to speech (TTS) module (e.g., including processing circuitry and/or program elements) 260. The elements 210, 220, 230, 240, 250, or 260 of the intelligent server 200 may be implemented separately from each other or at least some elements of the intelligent server 200 may be implemented integrally with each other. According to an embodiment, the intelligent server 200 may include a controller (or processor) to control the overall function operation of the element 210, 220, 230, 240, 250, or 260 and a network interface (or a communication interface or a communication module) to support the access to the telecommunication network. In addition, the intelligent server 200 may include a storage device (or a memory) including the element 210, 220, 230, 240, 250, or 260.

The NLU module 220 or the path planner module 230 of the intelligent server 200 may create a path rule.

According to an embodiment, the ASR module 210 may convert a user input received from the user terminal 100 into text data. For example, the ASR module 210 may include a speech recognition module. The speech recognition module may include an acoustic model and a language model. For example, the acoustic model may include information associated with phonation and the language model may include unit phonemic information and information on the combination of the unit phonemic information. The speech recognition module may convert the user utterance into the text data using the information associated with the phonation and the unit phonemic information. For example, the information on the acoustic model and the information on the language module may be stored in an automatic speech recognition database (DB) 211. According to an embodiment, the ASR module 210 may create a speaker-dependent recognition model based on a received initial user input and may store the created model in the automatic speech recognition DB 211. According to an embodiment, the ASR module 210 may determine whether a user input is generated from a speaker registered for the created model, based on a speaker recognition model.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input using the words that are the basis for grasping the intent. According to an embodiment, the NLU module 220 may determine the user intent using the NLU DB 221 storing the linguistic features for grasping the intent of the user input. According to another embodiment, the NLU module 220 may determine the user intent using a personal language model (PLM). For example, the NLU module 220 may determine the user intent using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the natural language generating module NLG 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

According to an embodiment, in the case where at least one element (e.g., the ASR module 210, the NLU module 220, or the like) performs the allocated function or interacts with the user terminal 100 (or a user), the above-described intelligent server 200 may update the at least one element. For example, the intelligent server 200 may update a model or a database associated with the function execution of the at least one element. The intelligent server 200 may transmit update information about the at least one element to the user terminal 100.

Figure 2D:
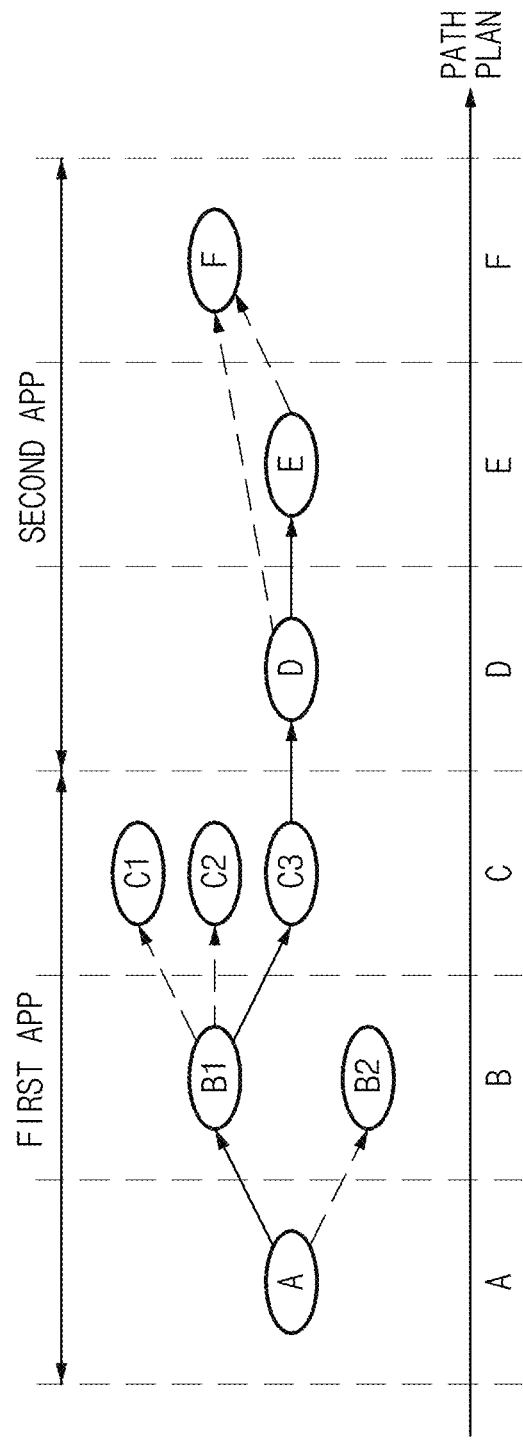
FIG. 2D is a diagram illustrating a manner of creating a path rule by a natural language understanding module, according to an embodiment.

FIG. 2D is a diagram illustrating a manner of creating a path rule by a natural language understanding module, according to an embodiment.

Referring to FIG. 2D, according to an embodiment, the NLU module 220 may divide the function of an app into actions (e.g., unit actions A to F) and may store the divided unit actions in the PR DB 231. For example, the NLU module 220 may store a path rule set, which includes a plurality of path rules A-B1-C1, A-B1-C2, A-B1-C3-D-F, A-B1-C3-D-E-F and A-B2 divided into unit actions, in the PR DB 231.

According to an embodiment, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligent server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user using the information about the insufficient parameter. If the additional input is received by the user, the intelligence agent 151 may transmit and process the additional input to the intelligent server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to an embodiment, in the case where a user input, in which a portion of information is missed, is received by the intelligent server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, using the user information. As such, even though the user input in which a portion of information is missed is received by the intelligent server 200, the NLU module 220 may make a request for the missed information to receive an additional input or may determine a path rule corresponding to the user input using user information.

As described above with reference to FIGS. 1, and 2A to 2D, the integrated intelligence system (see 10 of FIG. 1) may have a series of processes to provide a service based on speech recognition. For example, the user terminal (see 100 of FIG. 2A) may transmit the user utterance to the intelligent server (see 200 of FIG. 2C) by receiving the user utterance as the user input. The intelligent server 200 may create a path rule based on the user input. The user terminal 100 may receive the created path rule from the intelligent server 200 and may execute the function of a specific app depending on the path rule. According to an embodiment, in the above-described operations of the processes, the user terminal 100 may determine whether the user is in the proximity to the user terminal 100 and may control, based on the determination information, the screen output of an execution result (or the execution state) of at least one unit action depending on the path rule. In this connection, the user terminal 100 may be operated with a proximity function when the user is in the proximity to the user terminal 100 within a specific distance from the user terminal 100. According to an embodiment, the user terminal 100 may control the display 120 to be turned off based on that the user terminal 100 is operated with the proximity function, and may prevent the screen output of the execution result for at least a part of at least one unit action depending on the path rule. Hereinafter, the embodiments of providing the speech recognition service depending on the proximity state between the user terminal 100 and the user will be described.

Figure 3:
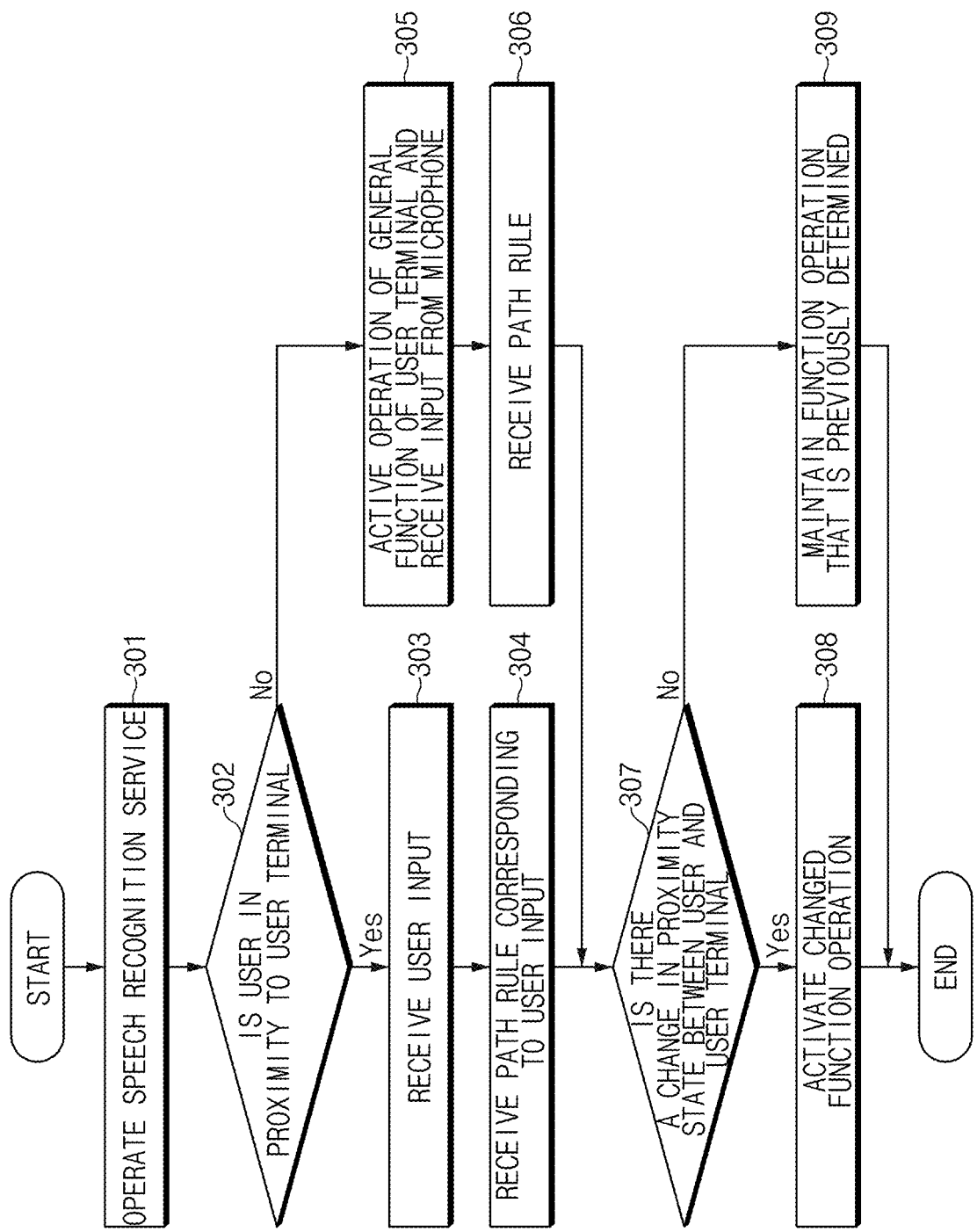
FIG. 3 is a flowchart illustrating a method for operating a speech recognition service by the user terminal, according to an embodiment.

FIG. 3 is a flowchart illustrating a method for operating a speech recognition service by a user terminal, according to an embodiment.

Referring to FIG. 3, in operation 301, a user may operate a speech recognition service through the user terminal (see 100 of FIG. 2A). In this connection, the user may execute the intelligent agent (see 151 of FIG. 2A), which is used to support operating the speech recognition service, by manipulating the physical button (e.g., see 112 of FIG. 2B) provided on the user terminal or by uttering a specific wake-up command speech (e.g., "Hi, Galaxy" or "Hi, BixBy"). According to an embodiment, as the intelligent agent is executed, an AI assistant (e.g., Bixby) responding to the user utterance may be activated based on that the function of the intelligent server (see 200 of FIG. 2C) is performed.

In operation 302, the intelligent agent may determine whether the user and the user terminal are in proximity to each other (proximity state). In this connection, the context module (see 155a of FIG. 2A) of the user terminal may obtain sensing information (e.g., information on the proximity between the user terminal and the user) from the sensor module (see 170 of FIG. 2a) mounted on the user terminal and may transmit the sensing information to the intelligent agent. The intelligent agent may determine whether the user and the user terminal are in the proximity to each other, based on the obtained sensing information and may transmit the sensing information to the intelligent server in real time or in a specific cycle. According to various embodiments, that the user and the user terminal are in the proximity to each other may be understood as that the user holding the user terminal makes a conversation gesture.

When it is determined that the user and the user terminal are in the proximity to each other, in operation 303, the intelligent agent of the user terminal may activate the operation of the proximity function of the user terminal and may obtain a user input (or a voice signal) received in the microphone (see 111 of FIG. 2A) as the user makes a speech. The user utterance may include a command or an intent associated with the execution (e.g., the execution and the operation of a specific app) of a specific function of the user terminal. According to an embodiment, the intelligent agent may increase a gain value for the user input to a specific size or may increase the gain value for the user input by dynamically applying the gain value depending on the volume of the user utterance. In this connection, the automatic gain control (AGC) module of the intelligent agent may adjust (e.g., amplify) the volume of the user input based on gain value control.

In operation 304, the intelligent agent of the user terminal may receive the path rule corresponding to the user utterance (or the user input or the voice signal) from the intelligent server. In this connection, referring to the above description, the intelligent agent may transmit the user input to the ASR module (see 210 of FIG. 2C) of the intelligent server, and the ASR module may recognize the user input and may convert the user input into the text data. The NLU module (see 220 of FIG. 2C) of the intelligent server may derive the speech intent of the user from the speech recognition result (or the converted text data) of the ASR module and may create or select the path rule for the operation to be performed on the user terminal, based on the speech intent of the user.

According to an embodiment, the intelligent agent may request a framework of the user terminal to turn off the display (see 120 of FIG. 2A) or to maintain the turn-off state of the display, based on the determination that the user and the user terminal are in the proximity to each other (or the operation of the proximity function of the user terminal is activated). In addition, the intelligent agent may transmit the path rule, which is received from the intelligent server (or the NLU module), to an execution manager module (153 of FIG. 2A) and the execution manager module may perform at least one unit action depending on the path rule. According to an embodiment, regarding the turn-off state of the display, the execution result screen (or the execution state) for each of at least one unit action may be processed in background in the display which is turned off.

In operation 302, when it is determined, due to the absence of the sensing information transmitted to the intelligent agent, that the user and the user terminal are spaced apart from each other (spacing state), the intelligent agent may activate the operation of the general function of the electronic device and may obtain a user input (or a voice signal) generated from the user utterance based on the microphone, in operation 305.

In operation 306, the intelligent agent may receive a path rule from the NLU of the intelligent server through a process the same as or similar to the above-described process in operation 304 and may transmit the path rule to the execution manager module. The execution manager module may perform at least one unit action based on the received path rule. In this case, as it is determined that the user and the user terminal is spaced apart from each other (or the operation of the general function for the user terminal is activated), the intelligent agent may request the framework of the user terminal to turn on the display (or request for maintain the turn-on state of the display) and may sequentially output an execution result screen for each of the at least one unit action.

According to an embodiment, the intelligent agent may determine, in real time, whether the user and the user terminal are in the proximity to each other, while the execution manager module performs at least one unit action. In this connection, in operation 307, the intelligent agent may determine whether there is a change in the determined proximity state or spacing state between the user and the user terminal. For example, the intelligent agent may determine whether the proximity state is changed to the spacing state between the user and the user terminal, whether the spacing state is changed to the proximity state between the user and the user terminal, and whether the present state is maintained between the user and the user terminal, based on whether the sensing information is provided from the context module.

When there is a change in the proximity state or the spacing state between the user terminal and the user, the intelligent agent may control the operation of the function of the user terminal, based on the changed information, in operation 308. For example, when the proximity state is changed to the spacing state between the user and the user terminal, the intelligent agent may activate the operation of the general function of the user terminal. Correspondingly, the intelligent agent may request the framework to turn on the display and may output the execution result screen for the unit action at a time point that the state between the user terminal and the user is changed. In addition, the intelligent agent may output the execution result screen of a final unit action by requesting for turning on the display or may output at least one of a text response and a voice response corresponding to that the final unit action is performed, together with the execution result screen. In the connection with the output of the response, the execution manager module may interact with a specific app to which at least one unit action included in the path rule is applied. For example, the execution manager module may execute (or, request for executing) a first unit action with respect to the specific app and may receive an execution completion response to the first unit action from the specific app. Identically or similarly, the execution manager module may execute (or request for executing) a second unit action of the path rule with respect to the specific app, and may receive an execution completion response to the second unit action from the specific app. As described above, the execution manager module may alternately process the execution of the unit action and the reception of the execution completion response. When receiving the execution completion response to the final unit action of the path rule, the execution manager module may transmit result information of the execution completion response to the intelligent agent. The intelligent agent may transmit the result information to the NLG module (see 250 of FIG. 2C) of the intelligent server. The NLG module 250 may generate a text response (e.g., a response in the form of a natural language) corresponding to the final unit action and may transmit the text response to the intelligent agent. In the case of a voice response, the TTS module (see 260 of FIG. 2C) of the intelligent server may receive the text response from the NLG module 250, may convert the text response into a voice response (or a voice signal), and may transmit the converted voice response to the intelligent agent.

Meanwhile, when the spacing state is changed to the proximity state between the user and the user terminal, the intelligent agent may activate the operation of the proximity function of the user terminal and may request the framework to turn off the display. In this operation, an execution result screen for a unit action performed after the change to the proximity state may be processed in background in the display which is turned off.

When there is no change in the proximity state or the spacing state between the user terminal and the user, in operation 309, the intelligent agent may maintain the operation of the function (e.g., the general function operation or the proximity function operation) of the relevant user terminal based on the proximity state or the spacing state between the user terminal and the user.

Figure 4A:
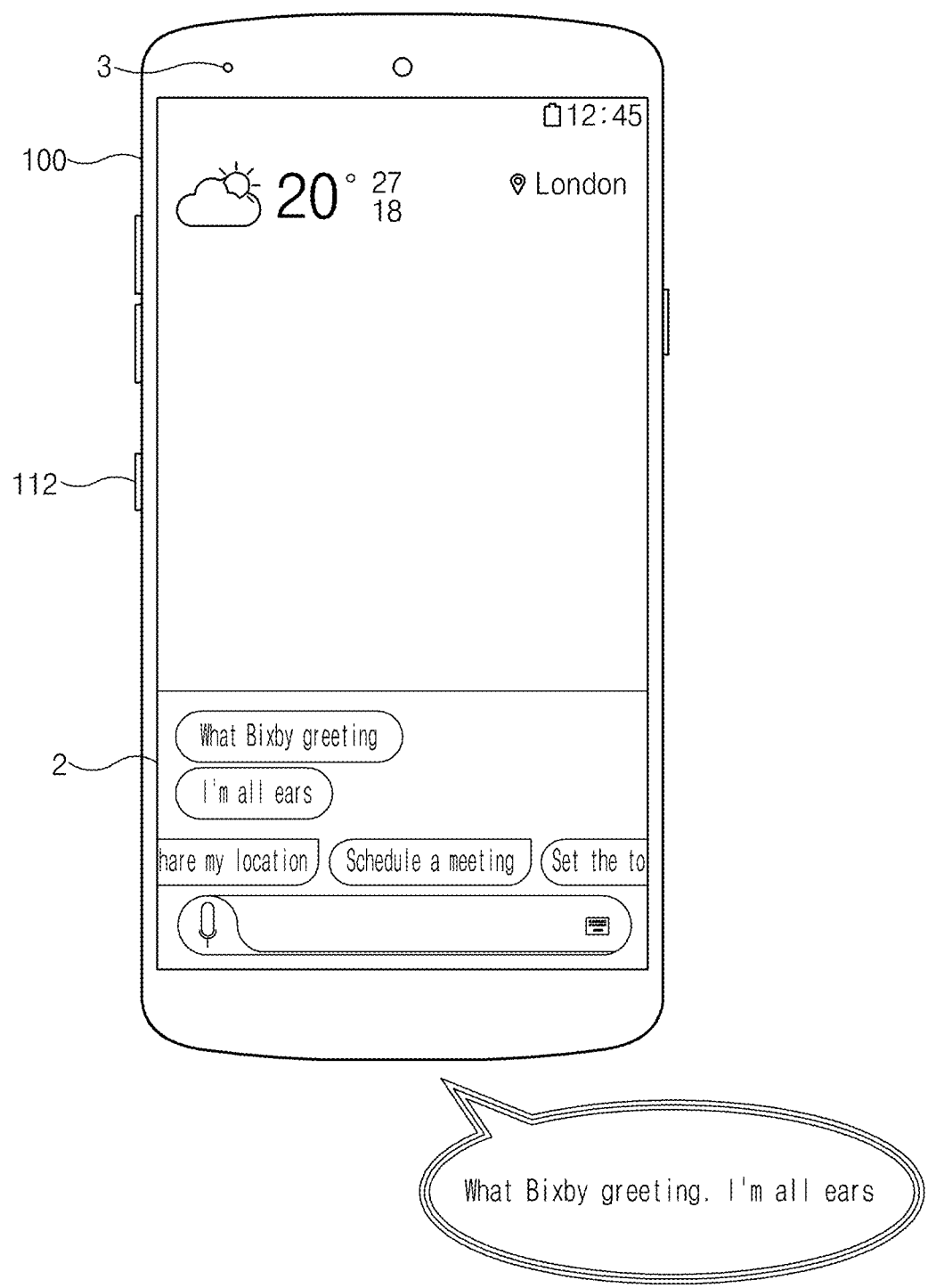
FIG. 4A is a diagram illustrating an operation of a speech recognition service for a first situation of the user terminal operated with a general function, according to an embodiment.
Figure 4B:
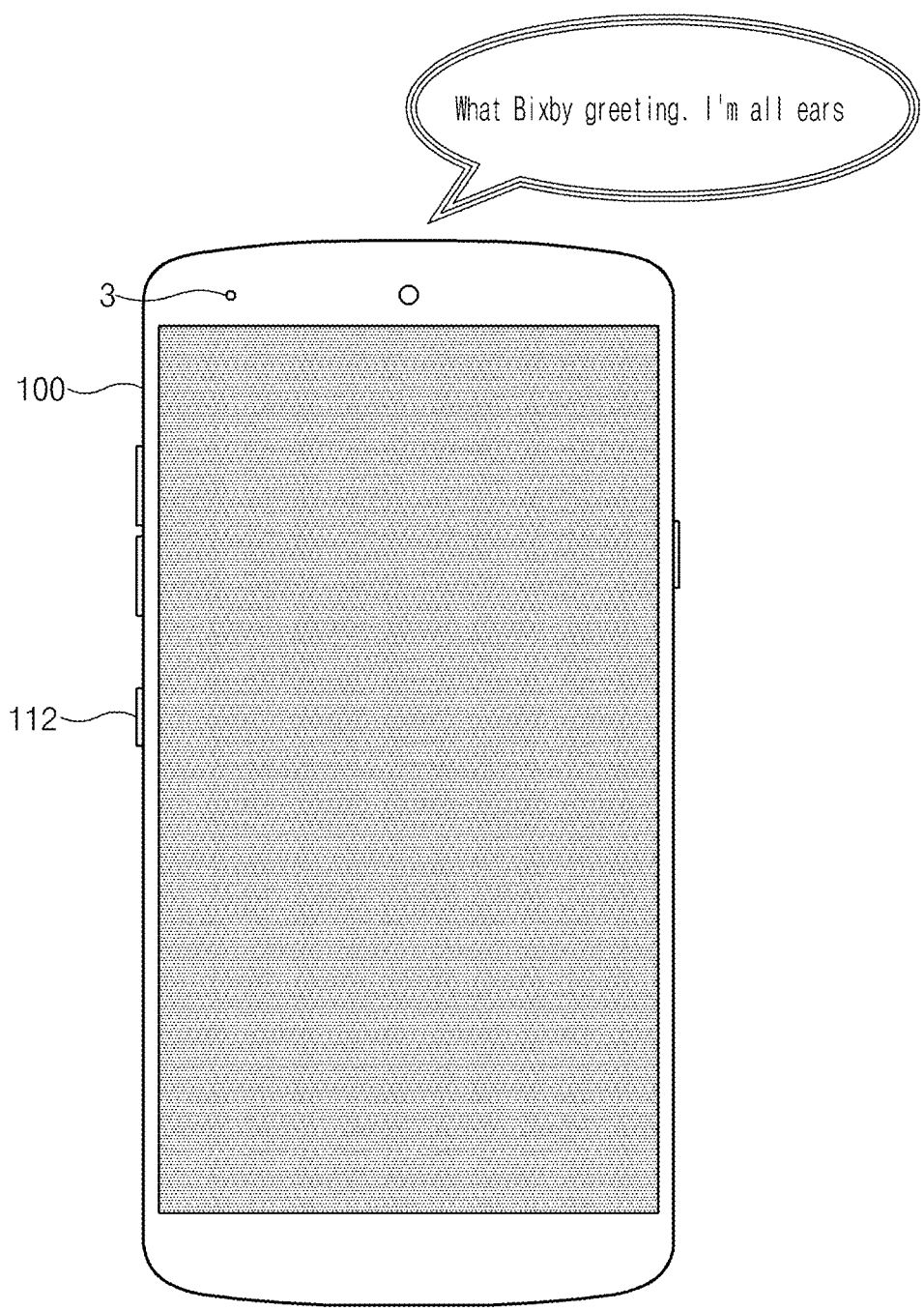
FIG. 4B is a diagram illustrating an operation of the speech recognition service for the first situation of the user terminal operated with a proximity function, according to an embodiment.

FIG. 4A is a diagram illustrating an operation of a speech recognition service for the first situation of the user terminal operated with the general function, according to an embodiment, and FIG. 4B is a view illustrating an operation of the speech recognition service for the first situation of the user terminal operated with the proximity function, according to an embodiment. In FIGS. 4A and 4B, the first situation may be understood as a situation that a user takes a specified action to control the starting (or activating) of the operation of the speech recognition service or to control the starting of the execution of the intelligent agent for supporting the operation of the speech recognition service.

As described above, the user may control the starting of the operation of the speech recognition service or the starting of the execution of the intelligent agent (see 151 of FIG. 2A) by manipulating a hardware key 112 provided at one region of the user terminal 100 or by making a specific wake-up command speech (e.g., "Hi, Galaxy" or "Hi Bixby"). In this operation, the sensor module (see 170 of FIG. 2A) 3 disposed in one front region of the user terminal 100 may sense the proximity of the user to the user terminal 100 and may provide sensing information to the context module (see 155a of FIG. 2A). The sensing information may be provided from the context module 155a to the intelligent agent 151 and may be transmitted to the intelligent server (see 200 of FIG. 2C) by the intelligent agent 151.

Referring to FIG. 4A, according to an embodiment, the intelligent agent 151 may determine that the user is spaced apart from the user terminal 100, based on whether there is absent the sensing information provided from the context manager module 155a. In this case, the user terminal 100 may output a specific screen while starting the execution of the intelligent agent 151, in response to that the hardware key 112 of the user is manipulated or the wake-up command speech is made. For example, the intelligent agent 151 may output a dialogue interface 2 for supporting the interaction between an AI assistant, which is activated in response to the execution of the intelligent agent 151, and the user. According to an embodiment, speech information (e.g., What Bixby greeting. I'm all ears) corresponding to the starting of the execution of the intelligent agent 151 (or corresponding to the activation of the AI assistant) may be stored on a memory (see 140 of FIG. 2A) of the user terminal 100. The intelligent agent 151 may output the speech information through a speaker (see 130 of FIG. 2A) recessed into one region of a lower end of the user terminal 100 while outputting the dialog interface 2.

Referring to FIG. 4B, according to an embodiment, the intelligent server 200 may determine that the user is in the proximity to the user terminal 100, based on the sensing information provided from the context module 155a. In this case, the execution of the intelligent agent 151 may be started in response to that the hardware key 112 of the user is manipulated or the wakeup command speech is made and the display (see 120 of FIG. 2A) may be controlled to be in a turn-off state (or may be maintained in the turn-off state). In this operation, the intelligent agent 151 may output speech information (or a sound) (e.g., What Bixby greeting. I'm all ears) corresponding to the starting of the execution of the intelligent agent 151 by controlling the receiver module (see reference module 160 of FIG. 2A) recessed into one region of an upper end of the user terminal 100.

Figure 5A:
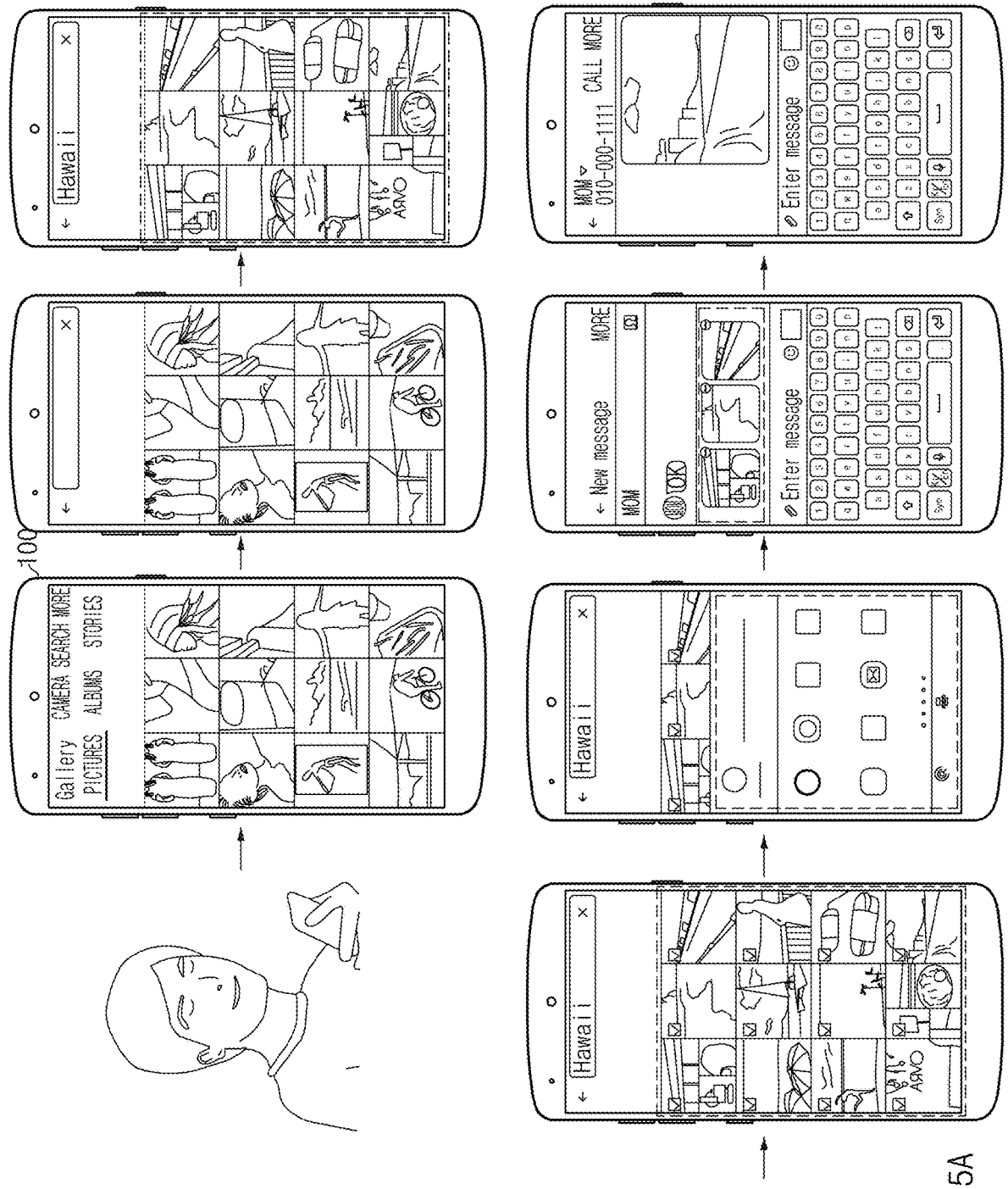
FIG. 5A is a diagram illustrating an operation of a speech recognition service for a second situation of the user terminal operated with a general function, according to an embodiment.

FIG. 5A is a diagram illustrating the use of a speech recognition service for a second situation of the user terminal operated with a general function, according to an embodiment. In FIG. 5A and FIGS. 5B, 5C and 5D to be described later, the second situation may be understood as a situation that a user controls a specific function operation of the user terminal by making a speech including a specific command or the intent of the user.

Referring to FIG. 5A, the user may make a speech (e.g., "send, to my mom, a message with a picture taken in Hawaii") including a specific command or an intent after the intelligent agent (see 151 of FIG. 2A) is executed (or after the AI assistant is activated) corresponding to the user control. In this operation, the intelligent agent 151 may determine that the user terminal (see 100 of FIG. 2A) and the user are spaced apart from each other, based on the absence of the sensing information. The intelligent agent 151 may activate the operation of the general function of the user terminal 100 based on the determination.

Meanwhile, the ASR module (see 210 of FIG. 2C) of the intelligent server 200 may perform speech recognition for a user input (or a voice input of the user) received from the user terminal 100 (or the intelligent agent 151) and may convert the recognition result into text data. The NLU module (see 220 of FIG. 2C) may derive the speech intent of the user from the recognition result (or the converted text data), may create or select a path rule corresponding to the speech intent of the user, and may transmit the path rule to the user terminal 100. According to an embodiment, the path rule for the speech (e.g., "send, to my mom, a message with a picture taken in Hawaii") of the user may be created by including unit actions of [executing a photo application], [executing a search function], [searching for Hawaii photos], [selecting a found photo], [displaying a share screen], [executing a message application], and [sending a message to my mom]. In addition, the path rule may be selected on a path rule database (see 231 of FIG. 2C) corresponding to the path planner module 230.

The intelligent agent 151 may receive the path rule and may transmit the path rule to the execution manager module (see 153 of FIG. 2A), and the execution manager module 153 may perform the above-described unit actions based on the path rule. In this operation, as it is determined that the user terminal 100 and the user are spaced apart from each other (or the operation of the general function for the user terminal 100 is activated), the intelligent agent 151 may request the framework to turn on the display (see 120 of FIG. 2A) and may sequentially output execution result screens or execution state screens for unit actions at a time point at which the relevant unit actions are executed or at a time point at which the relevant unit actions are finished. A plurality of screens illustrated in FIG. 5A may be examples of sequentially outputting the execution result screens or the execution state screens of the unit actions arranged in the sequence of [executing a photo application], [executing a search function], [searching for Hawaii photos], [selecting a found photo], [displaying a share screen], [executing a message application], and [sending a message to my mom], based on the arrangement.

Figure 5B:
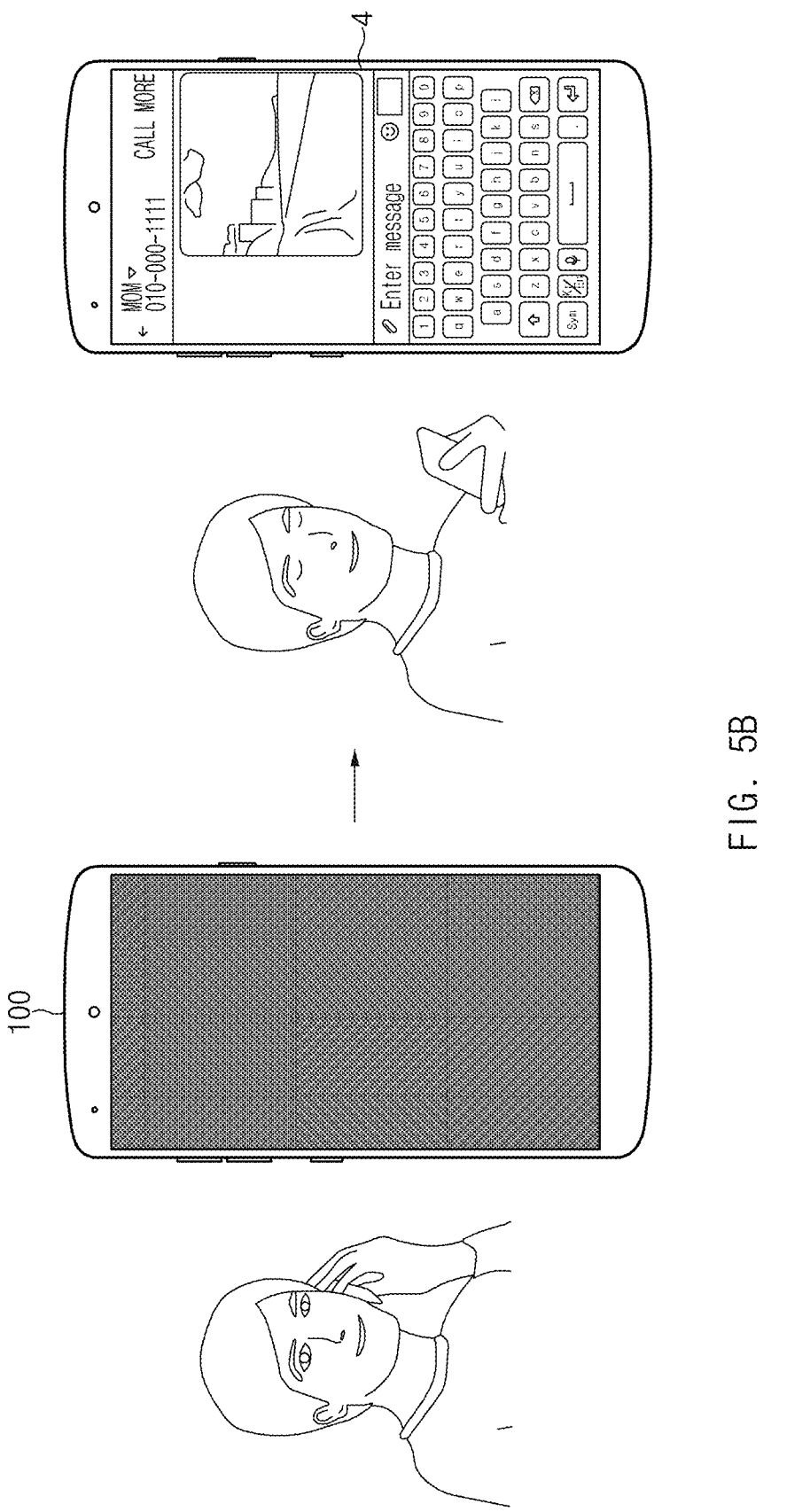
FIG. 5B is a diagram illustrating an operation of the speech recognition service for the second situation of the user terminal operated with a proximity function, according to an embodiment.
Figure 5D:
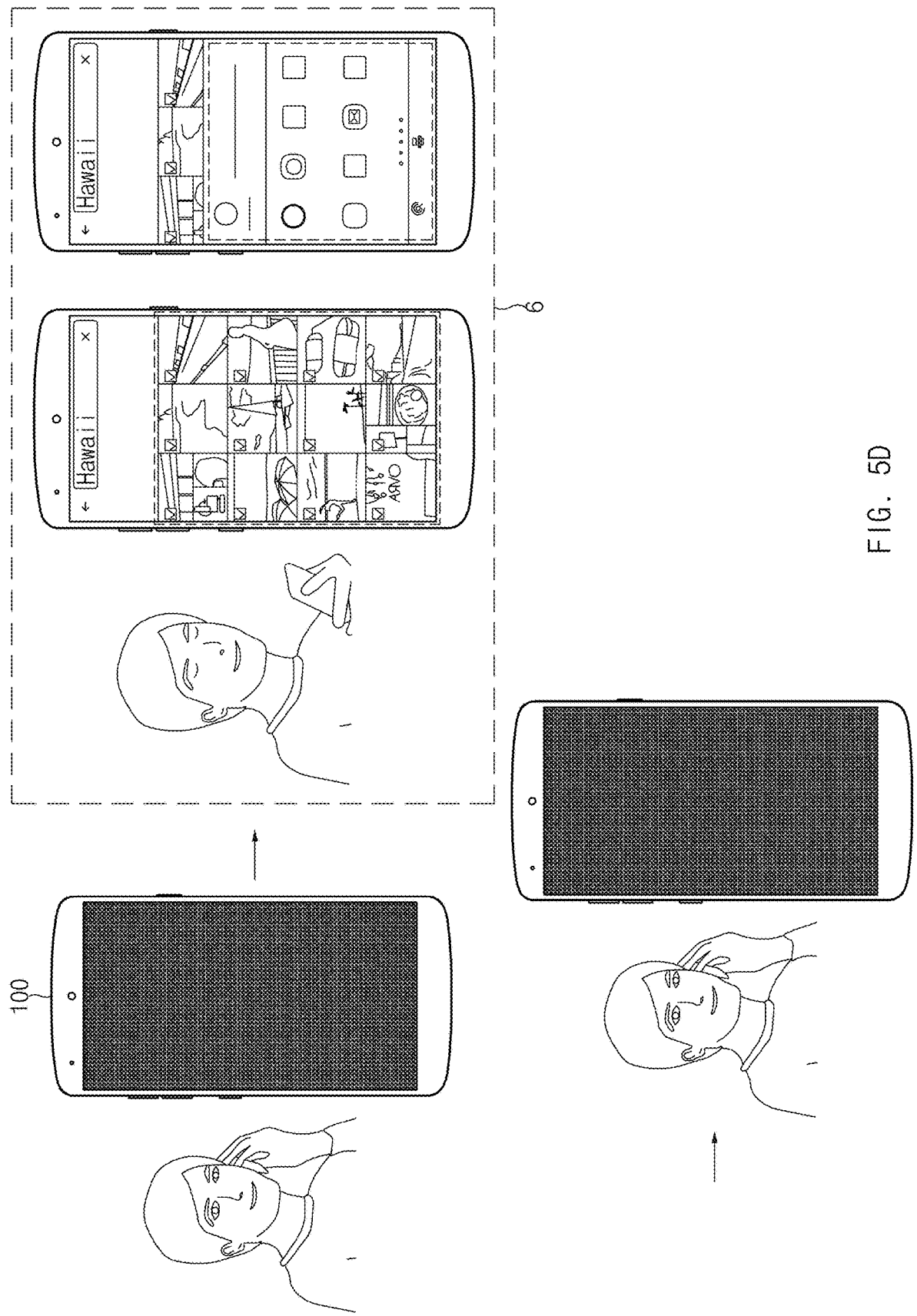
FIG. 5D is a diagram illustrating still another operation of the speech recognition service for the second situation of the user terminal operated with the proximity function, according to an embodiment.

FIGS. 5B, 5C and FIG. 5D are diagrams illustrating another use of the speech recognition service for the second situation of the user terminal operated with the proximity function, according to an embodiment.

According to an embodiment, after the intelligent agent (see 151 of FIG. 2A) is executed corresponding to the user control, the user may make a speech (e.g., "send, to my mom, a message with a picture taken in Hawaii") including the specific command or the intent. In this operation, the intelligent agent 151 may obtain sensing information of the sensor module (see 170 of FIG. 2A) from the context module (see 155A of FIG. 2A), and may determine that the user terminal (see 100 of FIG. 2A) and the user are in the proximity to each other. In FIGS. 5B, 5C and 5D, the user terminal 100 and the user are in the proximity to each other within a specific distance.

Referring to FIG. 5B, the intelligent agent 151 may activate the operation of the proximity function of the user terminal 100, based on the determination that the user terminal 100 and the user are in the proximity to each other. In addition, the intelligent agent 151 may receive a path rule, which corresponds to the speech intent of the user, from the NLU module (see reference 220 of FIG. 2C) of the intelligent server 200. In this operation, as it is determined that the user terminal 100 and the user are in the proximity to each other (or the operation of the proximity function for the user terminal 100 is activated), the intelligent agent 151 may request the framework to turn off the display (see 120 of FIG. 2A) (or request for maintaining the turn-off state of the display) and the execution manager module (see 153 of FIG. 2A) may execute at least one unit operation depending on the path rule. In this operation, the execution result screen or the execution state screen of each of the at least one unit action may be processed in background in the display 120 which is turned off.

According to an embodiment, when the proximity state between the user terminal 100 and the user is released and changed to the spacing state between the user terminal 100 and the user (or when the distance between the user terminal 100 and the user exceeds a specific distance range), the intelligent agent 151 may activate the operation of the general function of the user terminal 100. The intelligent agent 151 may request the framework to turn on the display 120 based on the operation of the general function of the user terminal 100 and may output the execution result screen or the execution state screen for the unit action of the path rule. For example, the intelligent agent 151 may output the execution result screen or the execution state screen 4 corresponding to the final unit operation (e.g., [send a message to my mom]) of the at least one unit action. In this operation, the execution manager module 153 may receive an execution completion response to the final unit action from a specific app to which the path rule is applied. The execution manager module 153 may transmit the execution completion response to the final unit action to the intelligent agent 151 and the intelligent agent 151 may transmit the execution completion response to the NLG module (see 250 of FIG. 2C) of the intelligent server 200. The NLG module 250 may generate a text response corresponding to the final unit action and the TTS module (see 260 of FIG. 2C) may convert the text response to the voice response and may transmit the voice response to the intelligent agent 151. According to an embodiment, the intelligent agent 151 may selectively output the received voice response through a speaker (see 130 of FIG. 2A) or the receiver module (see 160 of FIG. 2A) of the user terminal 100. For example, the intelligent agent 151 may request the framework to output the voice response through the speaker 130 as the state between the user terminal 100 and the user is changed to the spacing state. When the state between the user terminal 100 and the user is not changed to the spacing state, the intelligent agent 151 may output the voice response, which is received from the TTS module 260, through the receiver module 160.

Referring to FIG. 5C, as it is determined that the user terminal 100 and the user are in the proximity to each other, the intelligent agent 151 may activate the operation of the proximity function of the user terminal 100 and may request the framework to turn off the display 120 (or to maintain the turn-off state of the display 120). In addition, the intelligent agent may receive the path rule, which corresponds to the speech intent of the user, from the NLU module (see 220 of FIG. 2C) of the intelligent server (sees 200 of FIG. 2C) and may transmit the path rule to the execution manager module (153 of FIG. 2A). The execution manager module 153 may perform at least one unit action depending on the path rule. According to an embodiment, the intelligent agent 151 may output a voice response corresponding to the execution or the processing of the specific unit action at a time point 5 at which the specific unit action is performed. For example, the intelligent agent 151 may output a voice response to a previous unit action (e.g., [executing a message application) to the final unit action (e.g., [sending a message to my mom]) selected from at least one unit action forming the path rule. In this connection, the specific app (e.g., the message application), to which the path rule is applied, or an execution service created in the specific app may further transmit specified information to the execution manager module 153, in the operation of sending the execution completion response to the previous unit action to the final unit action. For example, the specific app may transmit, to the execution manager module 153, information representing that the execution of the final unit action is waited so as to wait for the confirmation of the user for the execution of the final unit operation. The execution manager module 153 may transmit at least one piece of information (e.g., information representing execution completion of the previous unit action to the final unit action and information that the execution of the final unit action is waited in relation to the confirmation of the user for the execution of the final unit action), which is received from the specific app, to the intelligent agent 151 and the intelligent agent 151 may transmit the at least one piece of information to the NLG module (see 250 of FIG. 2C) of the intelligent server 200. The NLG module 250 may make a response (e.g., May I send, to your mom, a message on the screen) associated with the final unit action on the path rule based on the at least one piece of information which is received. The TTS module (see 260 of FIG. 2C) may convert the response made by the NLG module 250 into a voice response (or a voice signal) and may transmit the response to the intelligent agent 151 of the user terminal 100. Accordingly, the intelligent agent 151 may output the voice response at the time point 5 at which the execution of the previous unit action to the final unit action is completed. When the feedback speech (e.g., a speech allowing the voice response) from the user for the voice response is performed, the execution manager module 153 may execute (or process) the final unit action on the path rule.

Referring to FIG. 5D, the intelligent agent 151 may request for turning off the display 120 and the execution manager module 153 may perform at least one unit action depending on the path rule. According to an embodiment, at a time point 6 at which the specific unit action other than the final unit action is executed by the execution manager module 153, the proximity state between the user terminal 100 and the user may be released and may be changed to the spacing state. This may be determined based on the sensing information sent to the intelligent agent 151 from the context module 155a. In this case, the intelligent agent 151 may deactivate the operation of the proximity function of the user terminal 100 and may activate the operation of the general function of the user terminal 100. The intelligent agent 151 may request the framework to turn on the display 120 as the state between the user and the user terminal 100 is changed to the spacing state (or as the operation of the general function of the user terminal 100 is activated) and the execution result screen or the execution state screen of the specific unit action may be output on the display 120. According to an embodiment, when the user terminal 100 and the user are maintained in the spacing state, the execution result screen or the execution state screen for the following at least one unit action may be output. Alternatively, when the intelligent agent 151 determines that the state between the user and the user terminal 100 becomes the proximity state by obtaining the sensing information, the operation of the proximity function of the user terminal 100 may be activated at the time point at which the proximity is determined. Accordingly, the display 120 is turned off, and the execution result screen or the execution state screen for the following at least one unit action may be processed in background in the display 120 which is turned off.

Figure 6A:
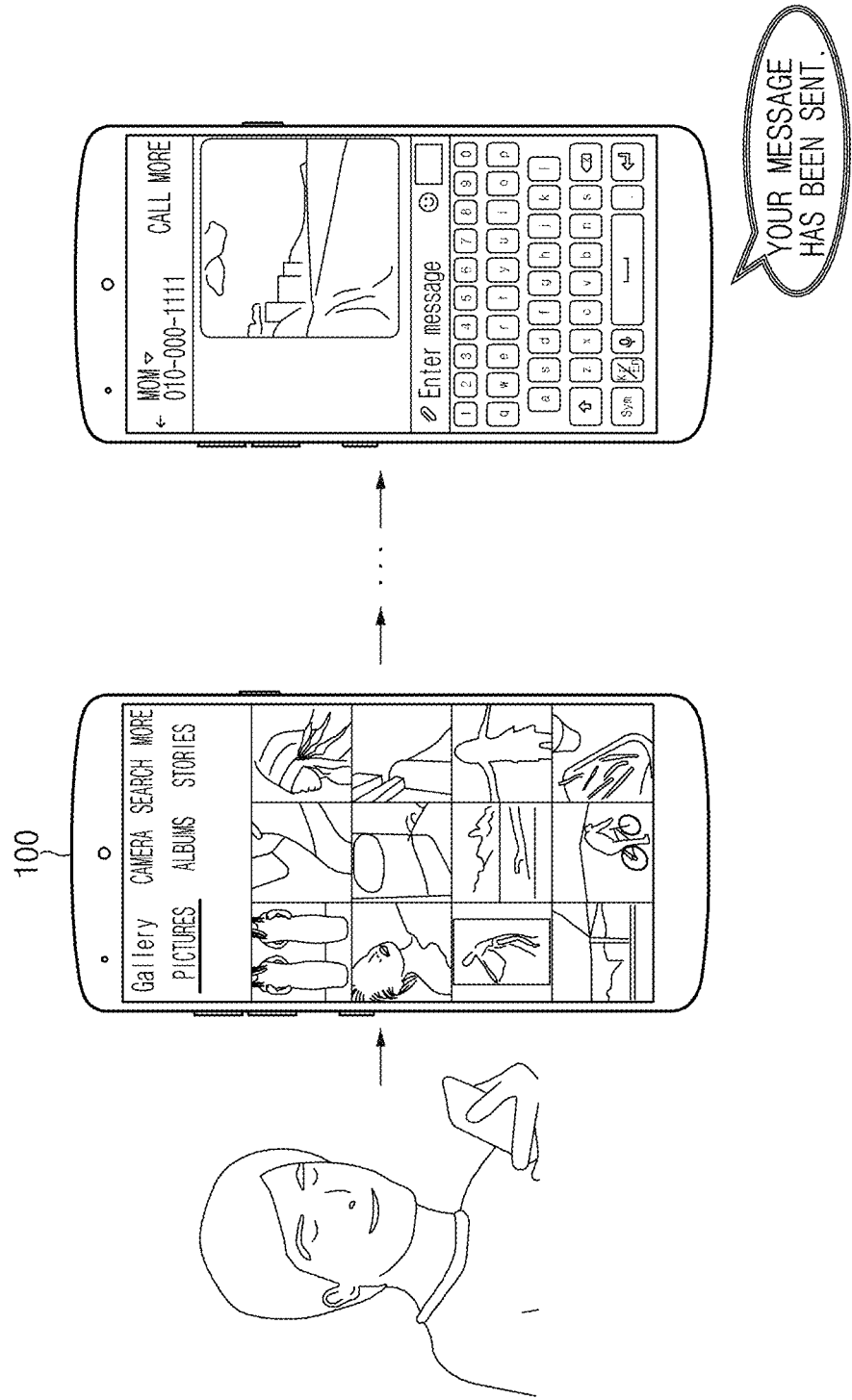
FIG. 6A is a diagram illustrating a speech answering output associated with the use of a speech recognition service by the user terminal operated with the general function, according to an embodiment.
Figure 6B:
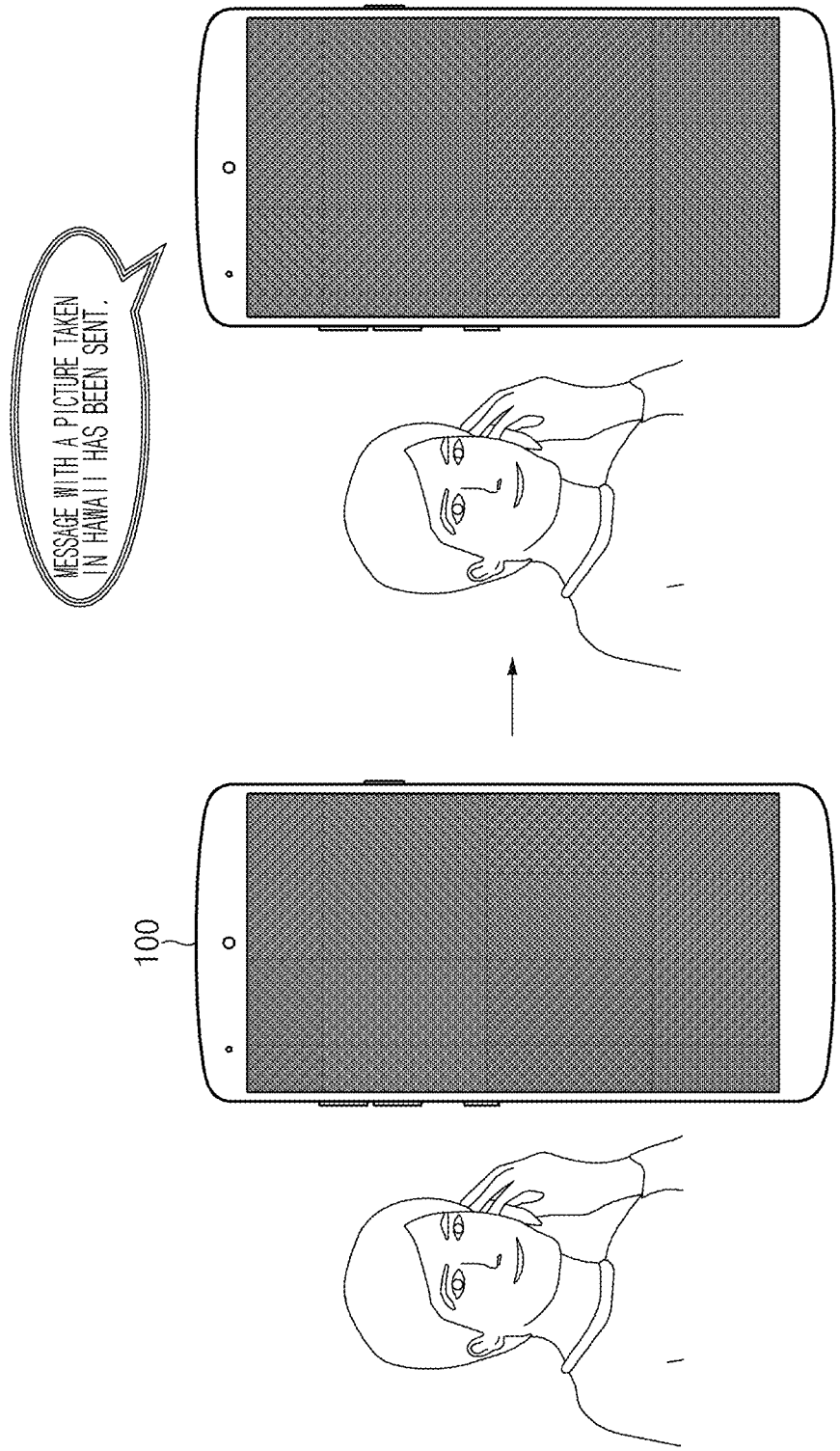
FIG. 6B is a diagram illustrating a speech answering output associated with the operation of a speech recognition service by the user terminal operated with the proximity function, according to an embodiment.

FIG. 6A is a diagram illustrating a speech answering output associated with the use of a speech recognition service by the user terminal operated with the general function, according to an embodiment, and FIG. 6B is a diagram illustrating a speech answering output associated with the use of a speech recognition service by the user terminal operated with the proximity function, according to an embodiment. The operation of the speech recognition service in FIGS. 6A and 6B may be understood as a situation the same as or similar to the second situation of FIGS. 5A, 5B, 5C and 5D (e.g., a situation to control a specific function operation of the user terminal as the user makes a speech including a specific command or a specific intent).

Referring to FIG. 6A, after the intelligent agent (see 151 of FIG. 2A) is performed, the user makes the speech (e.g., "Send, to my mom, a message with a picture taken in Hawaii") and the intelligent agent 151 may determine whether the user terminal 100 and the user are in proximity to each other based on whether the sensing information of the sensor module (see 170 of FIG. 2A) is received from the context module (see 155A of FIG. 2A). According to an embodiment, when it is determined that the user terminal 100 and the user are spaced apart from each other, the intelligent agent 151 may activate the operation of the general function of the user terminal 100 and may transmit the user input resulting from the user utterance to the intelligent server (see 200 of FIG. 2C).

In addition, the intelligent agent 151 may receive the path rule, which corresponds to the speech intent of the user, from the NLU module (sees 220 of FIG. 2C) of the intelligent server (sees 200 of FIG. 2C) and may transmit the path rule to the execution manager module (153 of FIG. 2A). The execution manager module 153 may execute at least one unit action based on the path rule. In this operation, the intelligent agent 151 may request the framework to turn on the display (see 120 of FIG. 2A) depending on the operation of the general function of the user terminal 100, and may output an execution result screen or an execution state screen for a relevant unit action of the at least one unit action at a time point at which the relevant unit action is executed or at a time point at which the execution of the relevant unit action is completed.

According to an embodiment, the NLG module (see reference module 250 of FIG. 2C) of the intelligent server 200 may receive the result information of the final unit action from the intelligent agent 151 and may generate a text response corresponding to the final unit action. In this operation, the NLG module 250 may receive, from the intelligent agent 151, information on the proximity state between the user terminal 100 the user and may generate a text response (e.g., message transmission has been completed) having a simpler form based on that the user terminal 100 and the user are spaced apart from each other. In addition, the TTS module (see 260 of FIG. 2C) may generate a voice response having a simpler form (e.g., "your message has been sent").

According to an embodiment, the intelligent agent 151 may receive the voice response from the TTS module 260 and may perform a control operation such that the voice response is output through the speaker (see 130 of FIG. 2A) based on that the user terminal 100 and the user are spaced apart from each other. According to various embodiments, when a sound output function of the user terminal 100 is operated as a vibration function or a mute function, the framework may prevent a sound from being output through the speaker 130.

Referring to FIG. 6B, it is determined when the user terminal 100 and the user are in the proximity to each other, the intelligent agent 151 may request the framework to turn off the display 120 (to maintain the turn-off state of the display 120), may receive the path rule from the NLU module 220, and may transmit the path rule to the execution manager module 153. The execution manager module 153 may perform at least one unit action based on the received path rule.

Similarly to the description made with reference to FIG. 6A, the NLG module 250 and the TTS module 260 may generate a text response and a voice response, respectively, based on the result information of the final unit action received from the intelligent agent 151. For example, the NLG module 250 and the TTS module 260 may determine that the user does not stare at the user terminal 100 (or may determine that the user makes a conversation gesture by holding the user terminal 100), depending on the information on the proximity state between the user terminal 100 and the user, which is provided from the intelligent agent 151. In addition, the NLG module 250 and the TTS module 260 may generate a response (e.g., "message with a picture taken in Hawaii has been sent.") having a more detailed form. As it is determined that the user terminal 100 and the user are in the proximity to each other, the intelligent agent 151 may output a voice response received from the TTS module 260 through the receiver module (see receiver module 160 of FIG. 2A) recessed into one region of the upper end of the user terminal 100.

As described with reference FIGS. 6A and 6B, the NLG module 250 and the TTS module 260 of the intelligent server 200 may receive, from the intelligent agent 151, the processing information for the final unit action and the information on whether the user terminal 100 and the user are in the proximity to each other, and may generate a simpler response or a more detailed response corresponding to the final unit action based on whether the user terminal 100 and the user are in the proximity to each other. In this connection, for example, the NLG module 250 and the TTS module 260 may generate a response having a simpler form (e.g., a response of "there are three schedules"; a text response or a voice response) with respect to a speech (e.g., "Let me know tomorrow's schedule") of the user when receiving the information on the spacing state between the user terminal 100 and the user. In addition, when receiving the information on the proximity state between the user terminal 100 and the user, the NLG module 250 and the TTS module 260 may generate a response (e.g., "There are three schedules of meeting at 9:00 a.m., a lunch date at 14:00, and workout at 19:00"; "There are three schedules, Do I let you know all?") having a more detailed form with respect to the speech (e.g., "Let me know tomorrow's schedule") of the user.

According to various embodiments described above, an electronic system may include an electronic device including a housing including a first surface, a display exposed through at least a portion of the first surface, a proximity sensor disposed on the first surface and adjacent to the display, a microphone, a first speaker disposed on the first surface and adjacent to the display, a second speaker disposed to be spaced apart from the first speaker, a wireless communication circuit, a first processor electrically connected with the display, the proximity sensor, the microphone, the first speaker, and the second speaker, the wireless communication circuit, and a first memory electrically connected with the first processor, and a first server including a network interface, a second processor electrically connected with the network interface, and a second memory electrically connected with the second processor.

According to various embodiments, the second memory may include an automatic speech recognition (ASR) module comprising program elements, a natural language understanding (NLU) module comprising program elements, and a natural language generator (NLG) module comprising program elements.

According to various embodiments, the first memory may store instructions that, when executed, cause the first processor to receive proximity data from the proximity sensor, receive a voice input using the microphone, and provide, to the second processor, at least one of first data associated with the voice input and/or second data associated with the proximity data through the wireless communication circuit.

According to various embodiments, the second memory may store instructions, that, when executed, cause the second processor to process the first data using at least one of the ASR module and/or the NLU module, generate a natural language response based on at least a portion of the second data using the NLG module, and provide the natural language response to the first processor.

According to various embodiments, the first memory may further store instructions that, when executed, cause the first processor to output at least a portion of the natural language response through the first speaker and/or through the display and the second speaker.

According to various embodiments, the instructions in the second memory may cause the second processor to generate a first natural language response when the second data indicates that an object is within a specified proximity of the proximity sensor.

According to various embodiments, the instructions in the first memory may cause the first processor to output at least a portion of the first natural language response through the first speaker during a turn-off state of the display.

According to various embodiments, the instructions in the first memory may cause the first processor to monitor third data provided by the proximity sensor and to output the at least a portion of the first natural language response using the first speaker and/or using the display and the second speaker, based on at least a portion of the third data.

According to various embodiments described above, an electronic system may include an electronic device including a housing including a first surface, a display exposed through at least a portion of the first surface, a proximity sensor disposed on the first surface and adjacent to the display, a microphone, a first speaker disposed on the first surface and adjacent to the display, a second speaker disposed to be spaced apart from the first speaker, a wireless communication circuit, a first processor electrically connected with the display, the proximity sensor, the microphone, the first speaker, the second speaker, and the wireless communication circuit, and a first memory electrically connected with the first processor, and a first server including a network interface, a second processor electrically connected with the network interface, and a second memory electrically connected with the second processor.

According to various embodiments, the second memory may include an automatic speech recognition (ASR) module, a natural language understanding (NLU) module, and a natural language generator (NLG) module.

According to various embodiments, the first memory may store instructions that, when executed, cause the first processor to receive a voice input using the microphone, and to provide, to the second processor, first data associated with the voice input through the wireless communication circuit.

According to various embodiments, the second memory may store instructions, that, when executed, cause the second processor to process the first data using at least one of the ASR module or the NLU module, to generate a natural language response based on at least a portion of the processed first data using the NLG module, and to provide the natural language response to the first processor through the network interface.

According to various embodiments, the first memory may further store instructions that, when executed, cause the first processor to monitor second data provided from the proximity sensor and output at least a portion of the response language response using the first speaker or the second speaker based on at least a portion of the second data.

According to various embodiments, the instructions of the first memory may cause the first processor to output at least a portion of the natural language response through the second speaker and the display.

As described above, according to various embodiments, an electronic device may include a communication module comprising communication circuitry configured to communicate with at least one external device, a sensor module comprising sensing circuitry configured to sense a proximity of an object to the electronic device, a microphone configured to receive a voice input, a memory configured to store information associated with operation of the speech recognition service, a display configured to output a screen associated with execution of a function of the electronic device, and a processor electrically connected with the communication module, the sensor module, the microphone, the memory, and the display.

According to various embodiments, the processor may be configured to determine whether the electronic device and a user are within a specified proximity to each other using the sensor module, control the electronic device to transmit at least one of voice input information and/or information on the proximity of the user to the external device, control the electronic device to receive at least one action associated with the execution of the function of the electronic device and corresponding to a recognition result from the external device based on voice input recognition of the external device, control the electronic device to output at least one content associated with execution and/or processing of each of the at least one action when the electronic device and the user are spaced apart from each other, and control the electronic device to prevent at least a portion of the at least one content from being output when the user and the electronic device are within the specified proximity to each other.

According to various embodiments, the processor may increase a gain value for a voice input, which is received in the state the electronic device and the user is in the proximity to each other, to a specified size and may transmit the gain value to the external device.

According to various embodiments, the processor may control the display to be turned off when it is determined that the electronic device and the user are within the specified proximity to each other and may process a screen associated with the execution and/or the processing of each of the at least one action in a background of the display which is turned off.

According to various embodiments, the processor may control the display, which is turned off, to be turned on, when a state between the electronic device and the user is changed from a proximity state, in which the electronic device and the user are within the specified proximity to each other, to a spacing state in which the electronic device and the user are spaced apart from each other, and control the electronic device to output a screen associated with execution and/or processing of a final action of the at least one action.

According to various embodiments, the processor may control the display, which is turned off, to be turned on, when a state between the electronic device and the user is changed from a proximity state, in which the electronic device and the user are within the specified proximity to each other, to a spacing state in which the electronic device and the user are spaced apart from each other, and control the electronic device to output a screen associated with execution or processing of an action of the at least one action, which is executed at a time that the state between the electronic device and the user is changed to the spacing state.

According to various embodiments, the electronic device may further include a hardware key disposed in one region of the electronic device.

According to various embodiments, the processor may control activation of the speech recognition service, based on the electronic device receiving a signal of an input applied to the hardware key.

According to various embodiments, the processor may control the electronic device to receive voice response information associated with a specific action of the at least one action, from the external device, and control the electronic device to output the voice response information at a time that the specific action is executed and/or completed, when a sound output function is provided in the electronic device.

According to various embodiments, the electronic device may further include a receiver module comprising receiver circuitry disposed in a first region of the electronic device, and a speaker disposed in a second region of the electronic device.

According to various embodiments, the processor may control the electronic device to output the voice response information using the receiver module, when it is determined that the electronic device and the user are within the specified proximity to each other.

According to various embodiments, the processor may control the electronic device to output the voice response information using the speaker, when it is determined that the electronic device and the user are spaced apart from each other.

According to various embodiments, the processor may control the electronic device to output specified voice information using the receiver module, when receiving a signal of an input applied to a hardware key, in a state that the sound output function is provided in the electronic device and the electronic device and the user are within the specified proximity to each other.

As described above, according to various embodiments, a method for operating a speech recognition service of an electronic device may include receiving a voice input, determining whether the electronic device and a user are within a specified proximity to each other, transmitting at least one of voice input information and/or information on the proximity of the user to an external device which supports the operation of the speech recognition service, receiving at least one action associated with execution of the function of the electronic device corresponding to a recognition result of the voice input information from the external device, outputting at least one content associated with execution or processing of each of the at least one action, when the electronic device and the user are spaced apart from each other, and preventing at least a portion of the at least one content from being output when the electronic device and the user are within the specified proximity to each other.

According to various embodiments, the transmitting of the at least one of voice input information or information on the proximity of the user may include increasing a gain value for a voice input, which is received in the state that the electronic device and the user are in the proximity to each other, to a specified size and transmitting the gain value to the external device.

According to various embodiments, the preventing of the at least a portion of the at least one content may include controlling a display of the electronic device to be turned off, when it is determined that the electronic device and the user are within the specified proximity to each other and processing a screen associated with the execution and/or the processing of each of the at least one action in background of the display which is turned off.

According to various embodiments, the preventing of the at least a portion of the at least one content may include controlling the display, which is turned off, to be turned on, when a state between the electronic device and the user is changed from a proximity state, in which the electronic device and the user are within the specified proximity to each other, to a spacing state in which the electronic device and the user is spaced apart from each other and outputting a screen associated with execution or processing of a final action of the at least one action.

According to various embodiments, the preventing of the at least a portion of the at least one content may include controlling the display, which is turned off, to be turned on, when a state between the electronic device and the user is changed from a proximity state, in which the electronic device and the user are within the specified proximity to each other, to a spacing state in which the electronic device and the user are spaced apart from each other, and outputting a screen associated with execution or processing of an action of the at least one action, which is executed at a time that the state between the electronic device and the user is changed to the spacing state.

According to various embodiments, the method for operating the speech recognition service of the electronic device may further include receiving a signal of a user input applied to a hardware key disposed in one region of the electronic device.

According to various embodiments, the receiving of the signal may include activating the speech recognition service.

According to various embodiments, the receiving of the signal may include receiving voice response information associated with a specific action of the at least one action from the external device.

According to various embodiments, the preventing of the at least a portion of the at least one content may include outputting the voice response information at a time that the specific action is executed and/or completed, when a sound output function is provided in the electronic device.

According to various embodiments, the outputting of the voice response information may include outputting the voice response information using a receiver module comprising receiver circuitry disposed in a first region of the electronic device, when the electronic device and the user are within the specified proximity to each other.

According to various embodiments, the outputting of the voice response information may include outputting the voice response information using a speaker disposed in a second region of the electronic device, when the electronic device and the user is spaced apart from each other.

FIG. 7 is a diagram illustrating an electronic device 701 in a network environment 700, according to an embodiment.

An electronic device 701 in a network environment 700 according to various embodiments of the present disclosure will be described with reference to FIG. 7. The electronic device 701 may include a bus 710, a processor (e.g., including processing circuitry) 720, a memory 730, an input/output interface (e.g., including input/output circuitry) 750, a display 760, and a communication interface (e.g., including communication circuitry) 770. In various embodiments of the present disclosure, at least one of the foregoing elements may be omitted or another element may be added to the electronic device 701.

The bus 710 may include a circuit for connecting the above-mentioned elements 710 to 770 to each other and transferring communications (e.g., control messages and/or data) among the above-mentioned elements.

The processor 720 may include various processing circuitry, such as, for example, and without limitation, at least one of a dedicated processor, a central processing unit (CPU), an application processor (AP), a communication processor (CP), or the like. The processor 720 may perform data processing or an operation related to communication and/or control of at least one of the other elements of the electronic device 701.

The memory 730 may include a volatile memory and/or a nonvolatile memory. The memory 730 may store instructions or data related to at least one of the other elements of the electronic device 701. According to an embodiment of the present disclosure, the memory 730 may store software and/or a program 740. The program 740 may include, for example, a kernel 741, a middleware 743, an application programming interface (API) 745, and/or an application program (or an application) 747. At least a portion of the kernel 741, the middleware 743, or the API 745 may be referred to as an operating system (OS).

The kernel 741 may control or manage system resources (e.g., the bus 710, the processor 720, the memory 730, or the like) used to perform operations or functions of other programs (e.g., the middleware 743, the API 745, or the application program 747). Furthermore, the kernel 741 may provide an interface for allowing the middleware 743, the API 745, or the application program 747 to access individual elements of the electronic device 701 in order to control or manage the system resources.

The middleware 743 may serve as an intermediary so that the API 745 or the application program 747 communicates and exchanges data with the kernel 741.

Furthermore, the middleware 743 may handle one or more task requests received from the application program 747 according to a priority order. For example, the middleware 743 may assign at least one application program 747 a priority for using the system resources (e.g., the bus 710, the processor 720, the memory 730, or the like) of the electronic device 701. For example, the middleware 743 may handle the one or more task requests according to the priority assigned to the at least one application, thereby performing scheduling or load balancing with respect to the one or more task requests.

The API 745, which is an interface for allowing the application 747 to control a function provided by the kernel 741 or the middleware 743, may include, for example, at least one interface or function (e.g., instructions) for file control, window control, image processing, character control, or the like.

The input/output interface 750 may include various input/output circuitry and serve to transfer an instruction or data input from a user or another external device to (an)other element(s) of the electronic device 701. Furthermore, the input/output interface 750 may output instructions or data received from (an)other element(s) of the electronic device 701 to the user or another external device.

The display 760 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. The display 760 may present various content (e.g., a text, an image, a video, an icon, a symbol, or the like) to the user. The display 760 may include a touch screen, and may receive a touch, gesture, proximity or hovering input from an electronic pen or a part of a body of the user.

The communication interface 770 may include various communication circuitry and set communications between the electronic device 701 and an external device (e.g., a first external electronic device 702, a second external electronic device 704, or a server 706). For example, the communication interface 770 may be connected to a network 762 via wireless communications or wired communications so as to communicate with the external device (e.g., the second external electronic device 704 or the server 706).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 764. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 701 may transmit the electromagnetic signals to a reader device such as a POS (point of sales) device. The POS device may detect the magnetic signals using an MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 762 may include at least one of telecommunications networks, for example, a computer network (e.g., local area network (LAN) or wide area network (WAN)), the Internet, or a telephone network.

The types of the first external electronic device 702 and the second external electronic device 704 may be the same as or different from the type of the electronic device 701. According to an embodiment of the present disclosure, the server 706 may include a group of one or more servers. A portion or all of operations performed in the electronic device 701 may be performed in one or more other electronic devices (e.g., the first electronic device 702, the second external electronic device 704, or the server 706). When the electronic device 701 should perform a certain function or service automatically or in response to a request, the electronic device 701 may request at least a portion of functions related to the function or service from another device (e.g., the first electronic device 702, the second external electronic device 704, or the server 706) instead of or in addition to performing the function or service for itself. The other electronic device (e.g., the first electronic device 702, the second external electronic device 704, or the server 706) may perform the requested function or additional function, and may transfer a result of the performance to the electronic device 701. The electronic device 701 may use a received result itself or additionally process the received result to provide the requested function or service. To this end, for example, a cloud computing technology, a distributed computing technology, or a client-server computing technology may be used.

FIG. 8 is a block diagram illustrating the electronic device, according to an embodiment.

Referring to FIG. 8, the electronic device 801 may include, for example, all or part of an electronic device 701 shown in FIG. 7. The electronic device 801 may include one or more processors (e.g., including processing circuitry) 810 (e.g., application processors (APs)), a communication module (e.g., including communication circuitry) 820, a subscriber identification module (SIM) 829, a memory 830, a security module 836, a sensor module 840, an input device (e.g., including input circuitry) 850, a display 860, an interface (e.g., including interface circuitry) 870, an audio module 880, a camera module 891, a power management module 895, a battery 896, an indicator 897, and a motor 898.

The processor 810 may include various processing circuitry and drive, for example, an operating system (OS) or an application program to control a plurality of hardware or software components connected thereto and may process and compute a variety of data. The processor 810 may be implemented with, for example, a system on chip (SoC). According to an embodiment of the present disclosure, the processor 810 may include a graphic processing unit (GPU) (not shown) and/or an image signal processor (not shown). The processor 810 may include at least some (e.g., a cellular module 821) of the components shown in FIG. 8. The processor 810 may load a command or data received from at least one of other components (e.g., a non-volatile memory) into a volatile memory to process the data and may store various data in a non-volatile memory.

The communication module 820 may have the same or similar configuration to the communication interface 770 of FIG. 7. The communication module 820 may include various communication circuitry included in various communication modules, such as, for example, and without limitation, the cellular module 821, a wireless-fidelity (Wi-Fi) module 822, a Bluetooth (BT) module 823, a global navigation satellite system (GNSS) module 824 (e.g., a GPS module, a Glonass module, a Beidou module, or a Galileo module), a near field communication (NFC) module 825, an MST module 826, and a radio frequency (RF) module 827, or the like.

The cellular module 821 may provide, for example, a voice call service, a video call service, a text message service, or an Internet service, and the like through a communication network. According to an embodiment of the present disclosure, the cellular module 821 may identify and authenticate the electronic device 801 in a communication network using the SIM 829 (e.g., a SIM card). According to an embodiment of the present disclosure, the cellular module 821 may perform at least part of functions which may be provided by the processor 810. According to an embodiment of the present disclosure, the cellular module 821 may include a communication processor (CP).

The Wi-Fi module 822, the BT module 823, the GNSS module 824, the NFC module 825, or the MST module 826 may include, for example, a processor for processing data transmitted and received through the corresponding module. According to various embodiments of the present disclosure, at least some (e.g., two or more) of the cellular module 821, the Wi-Fi module 822, the BT module 823, the GNSS module 824, the NFC module 825, or the MST module 826 may be included in one integrated chip (IC) or one IC package.

The RF module 827 may transmit and receive, for example, a communication signal (e.g., an RF signal). Though not shown, the RF module 827 may include, for example, a transceiver, a power amplifier module (PAM), a frequency filter, or a low noise amplifier (LNA), or an antenna, and the like. According to another embodiment of the present disclosure, at least one of the cellular module 821, the Wi-Fi module 822, the BT module 823, the GNSS module 824, the NFC module 825, or the MST module 826 may transmit and receive an RF signal through a separate RF module.

The SIM 829 may include, for example, a card which includes a SIM and/or an embedded SIM. The SIM 829 may include unique identification information (e.g., an integrated circuit card identifier (ICCID)) or subscriber information (e.g., an international mobile subscriber identity (IMSI)).

The memory 830 (e.g., a memory 730 of FIG. 7) may include, for example, an embedded memory 832 and/or an external memory 834. The embedded memory 832 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 834 may include a flash drive, for example, a compact flash (CF), a secure digital (SD), a micro-SD, a mini-SD, an extreme digital (xD), a multimedia car (MMC), or a memory stick, and the like. The external memory 834 may operatively and/or physically connect with the electronic device 801 through various interfaces.

The security module 836 may be a module which has a relatively higher secure level than the memory 830 and may be a circuit which stores secure data and guarantees a protected execution environment. The security module 836 may be implemented with a separate circuit and may include a separate processor. The security module 836 may include, for example, an embedded secure element (eSE) which is present in a removable smart chip or a removable SD card or is embedded in a fixed chip of the electronic device 801. Also, the security module 836 may be driven by an OS different from the OS of the electronic device 801. For example, the security module 836 may operate based on a java card open platform (JCOP) OS.

The sensor module 840 may measure, for example, a physical quantity or may detect an operation state of the electronic device 801, and may convert the measured or detected information to an electrical signal. The sensor module 840 may include at least one of, for example, a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illumination (illuminance) sensor 840K, and/or an ultraviolet (UV) sensor 840M. Additionally or alternatively, the sensor module 840 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 840 may further include a control circuit for controlling at least one or more sensors included therein. According to various embodiments of the present disclosure, the electronic device 801 may further include a processor configured to control the sensor module 840, as part of the processor 810 or to be independent of the processor 810. While the processor 810 is in a sleep state, the electronic device 801 may control the sensor module 840.

The input device 850 may include various input circuitry, such as, for example, and without limitation, a touch panel 852, a (digital) pen sensor 854, a key 856, and/or an ultrasonic input device 858, or the like. The touch panel 852 may use at least one of, for example, a capacitive type, a resistive type, an infrared type, or an ultrasonic type. Also, the touch panel 852 may further include a control circuit. The touch panel 852 may further include a tactile layer and may provide a tactile reaction to a user.

The (digital) pen sensor 854 may be, for example, part of the touch panel 852 or may include a separate sheet for recognition. The key 856 may include, for example, a physical button, an optical key, or a keypad. The ultrasonic input device 858 may allow the electronic device 801 to detect a sound wave using a microphone (e.g., a microphone 888) and to verify data through an input tool generating an ultrasonic signal.

The display 860 (e.g., a display 760 of FIG. 7) may include a panel 862, a hologram device 864, or a projector 866. The panel 862 may include the same or similar configuration to the display 760. The panel 862 may be implemented to be, for example, flexible, transparent, or wearable. The panel 862 and the touch panel 852 may be integrated into one module. The hologram device 864 may show a stereoscopic image in a space using interference of light. The projector 866 may project light onto a screen to display an image. The screen may be positioned, for example, inside or outside the electronic device 801. According to an embodiment of the present disclosure, the display 860 may further include a control circuit for controlling the panel 862, the hologram device 864, or the projector 866.

The interface 870 may include various interface circuitry, such as, for example, and without limitation, a high-definition multimedia interface (HDMI) 872, a universal serial bus (USB) 874, an optical interface 876, and/or a D-subminiature 878, or the like. The interface 870 may be included in, for example, the communication interface 770 shown in FIG. 7. Additionally or alternatively, the interface 870 may include, for example, a mobile high definition link (MHL) interface, an SD card/multimedia card (MMC) interface, or an infrared data association (IrDA) standard interface.

The audio module 880 may convert a sound and an electric signal in dual directions. At least part of components of the audio module 880 may be included in, for example, an input and output interface 750 (or a user interface) shown in FIG. 7. The audio module 880 may process sound information input or output through, for example, a speaker 882, a receiver 884, an earphone 886, or the microphone 888, and the like.

The camera module 891 may be a device which captures a still image and a moving image. According to an embodiment of the present disclosure, the camera module 891 may include one or more image sensors (not shown) (e.g., a front sensor or a rear sensor), a lens (not shown), an image signal processor (ISP) (not shown), or a flash (not shown) (e.g., an LED or a xenon lamp).

The power management module 895 may manage, for example, power of the electronic device 801. According to an embodiment of the present disclosure, though not shown, the power management module 895 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 896 and voltage, current, or temperature thereof while the battery 896 is charged. The battery 896 may include, for example, a rechargeable battery or a solar battery.

The indicator 897 may display a specific state of the electronic device 801 or part (e.g., the processor 810) thereof, for example, a booting state, a message state, or a charging state, and the like. The motor 898 may convert an electric signal into mechanical vibration and may generate vibration or a haptic effect, and the like. Though not shown, the electronic device 801 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 9:
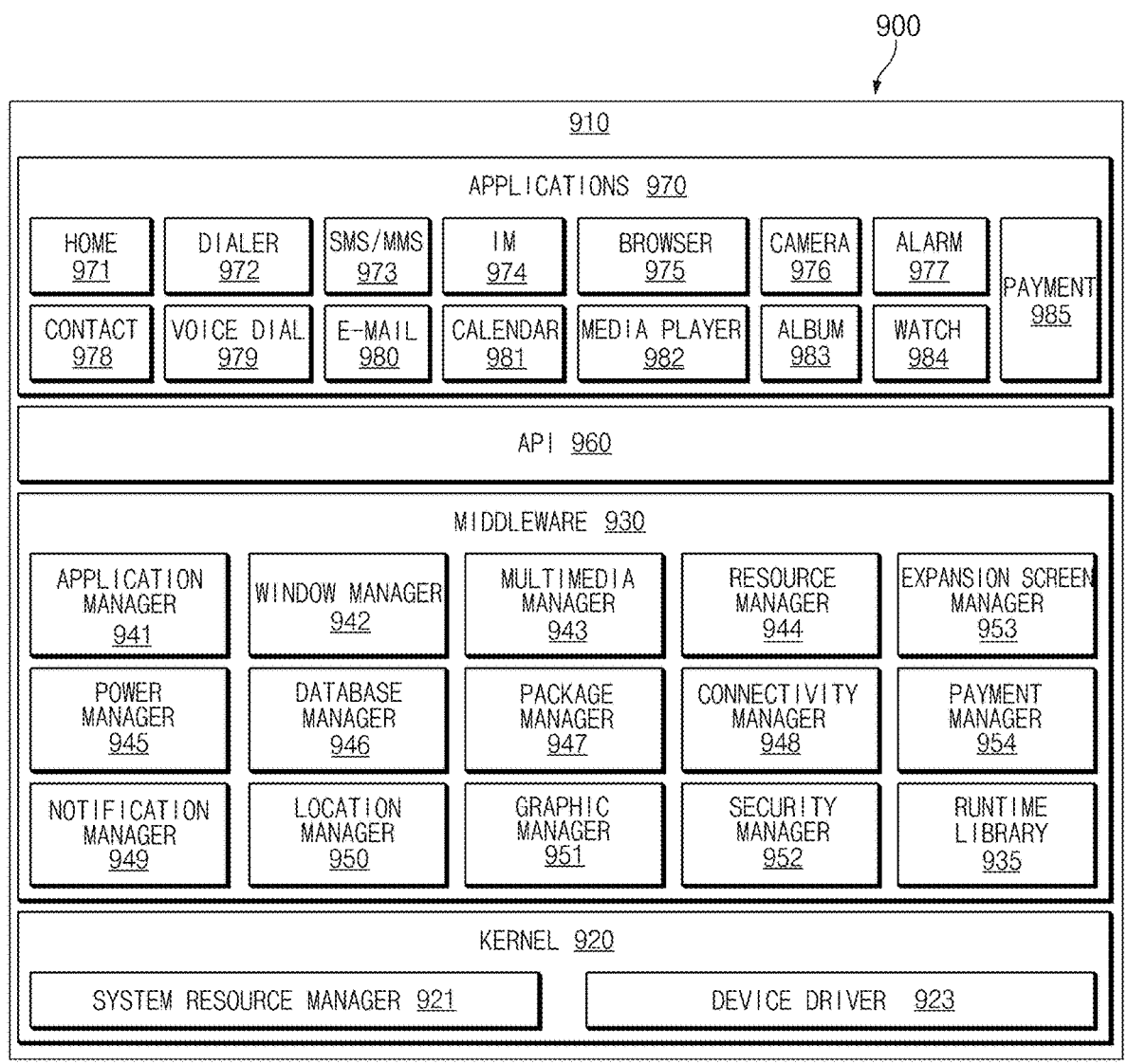
FIG. 9 is a block diagram illustrating a program module, according to an embodiment.

FIG. 9 is a block diagram illustrating a program module, according to an embodiment.

According to an embodiment of the present disclosure, the program module 910 (e.g., a program 740 of FIG. 7) may include an operating system (OS) for controlling resources associated with an electronic device (e.g., an electronic device 701 of FIG. 7) and/or various applications (e.g., an application program 747 of FIG. 7) which are executed on the OS. The OS may be, for example, Android, iOS, Windows, Symbian, Tizen, or Bada, and the like.

The program module 910 may include a kernel 920, a middleware 930, an application programming interface (API) 960, and/or an application 970. At least part of the program module 910 may be preloaded on the electronic device, or may be downloaded from an external electronic device (e.g., a first external electronic device 702, a second external electronic device 704, or a server 706, and the like of FIG. 7).

The kernel 920 (e.g., a kernel 741 of FIG. 7) may include, for example, a system resource manager 921 and/or a device driver 923. The system resource manager 921 may control, assign, or collect, and the like system resources. According to an embodiment of the present disclosure, the system resource manager 921 may include a process management unit, a memory management unit, or a file system management unit, and the like. The device driver 923 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 930 (e.g., a middleware 743 of FIG. 7) may provide, for example, functions the application 970 needs in common, and may provide various functions to the application 970 through the API 960 such that the application 970 efficiently uses limited system resources in the electronic device. According to an embodiment of the present disclosure, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, expansion screen manager 954, and/or a payment manager 954, or the like.

The runtime library 935 may include, for example, a library module used by a compiler to add a new function through a programming language while the application 970 is executed. The runtime library 935 may perform a function about input and output management, memory management, or an arithmetic function.

The application manager 941 may manage, for example, a life cycle of at least one of the application 970. The window manager 942 may manage graphic user interface (GUI) resources used on a screen of the electronic device. The multimedia manager 943 may determine a format utilized for reproducing various media files and may encode or decode a media file using a codec corresponding to the corresponding format. The resource manager 944 may manage source codes of at least one of the application 970, and may manage resources of a memory or a storage space, and the like.

The power manager 945 may act together with, for example, a basic input/output system (BIOS) and the like, may manage a battery or a power source, and may provide power information utilized for an operation of the electronic device. The database manager 946 may generate, search, or change a database to be used in at least one of the application 970. The package manager 947 may manage installation or update of an application distributed by a type of a package file.

The connectivity manager 948 may manage, for example, wireless connection such as Wi-Fi connection or BT connection, and the like. The notification manager 949 may display or notify events, such as an arrival message, an appointment, and proximity notification, by a method which is not disturbed to the user. The location manager 950 may manage location information of the electronic device. The graphic manager 951 may manage a graphic effect to be provided to the user or a user interface (UI) related to the graphic effect. The security manager 952 may provide all security functions utilized for system security or user authentication, and the like. According to an embodiment of the present disclosure, when the electronic device (e.g., an electronic device 701 of FIG. 7) has a phone function, the middleware 930 may further include a telephony manager (not shown) for managing a voice or video communication function of the electronic device.

The middleware 930 may include a middleware module which configures combinations of various functions of the above-described components. The middleware 930 may provide a module which specializes according to kinds of OSs to provide a differentiated function. Also, the middleware 930 may dynamically delete some of old components or may add new components.

The API 960 (e.g., an API 745 of FIG. 7) may be, for example, a set of API programming functions, and may be provided with different components according to OSs. For example, in case of Android or iOS, one API set may be provided according to platforms. In case of Tizen, two or more API sets may be provided according to platforms.

The application 970 (e.g., an application program 747 of FIG. 7) may include one or more of, for example, a home application 971, a dialer application 972, a short message service/multimedia message service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a clock (watch application 984, a payment application 985, a health care application (not shown) (e.g., an application for measuring quantity of exercise or blood sugar, and the like), or an environment information application (not shown) (e.g., an application for providing atmospheric pressure information, humidity information, or temperature information, and the like), and the like.

According to an embodiment of the present disclosure, the application 970 may include an application (hereinafter, for better understanding and ease of description, referred to as "information exchange application") for exchanging information between the electronic device (e.g., the electronic device 701 of FIG. 7) and an external electronic device (e.g., the first external electronic device 702 or the second external electronic device 704). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 702 or the second external electronic device 704). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 702 or the second external electronic device 704) which communicates with the electronic device, an application which operates in the external electronic device, or a service (e.g., a call service or a message service) provided from the external electronic device.

According to an embodiment of the present disclosure, the application 970 may include an application (e.g., the health card application of a mobile medical device) which is preset according to attributes of the external electronic device (e.g., the first external electronic device 702 or the second external electronic device 704). According to an embodiment of the present disclosure, the application 970 may include an application received from the external electronic device (e.g., the server 706, the first external electronic device 702, or the second external electronic device 704). According to an embodiment of the present disclosure, the application 970 may include a preloaded application or a third party application which may be downloaded from a server. Names of the components of the program module 910 according to various embodiments of the present disclosure may differ according to kinds of OSs.

According to various embodiments of the present disclosure, at least part of the program module 910 may be implemented with software, firmware, hardware, or at least two or more combinations thereof. At least part of the program module 910 may be implemented (e.g., executed) by, for example, a processor (e.g., a processor 810). At least part of the program module 910 may include, for example, a module, a program, a routine, sets of instructions, or a process, and the like for performing one or more functions.

The term "module" used herein may represent, for example, a unit including one of hardware, software and firmware or any combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific integrated circuit (ASIC) chip, a field-programmable gate array (FPGA), and/or a programmable-logic device for performing some operations, or the like which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 720), the processor may perform functions corresponding to the instructions. The computer-readable storage medium may be, for example, the memory 730.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic system comprising:
    an electronic device including a housing including a first surface, a viewable display, a proximity sensor disposed on the first surface and adjacent to the display, a microphone, a first speaker disposed on the first surface and adjacent to the display, a second speaker disposed to be spaced apart from the first speaker, a wireless communication circuit, a first processor electrically connected with the display, the proximity sensor, the microphone, the first speaker, the second speaker, and the wireless communication circuit, and a first memory electrically connected with the first processor, and
    a first server including a network interface, a second processor electrically connected with the network interface, and a second memory electrically connected with the second processor,
    wherein the second memory includes an automatic speech recognition (ASR) module comprising processing circuitry and program elements, a natural language understanding (NLU) module comprising processing circuitry and program elements, and a natural language generator (NLG) module comprising processing circuitry and program elements,
    wherein the first memory stores instructions that, when executed, cause the first processor to:
    receive proximity data from the proximity sensor;
    receive a voice input using the microphone; and
    provide, to the second processor, first data associated with the voice input and second data associated with the proximity data through the wireless communication circuit,
    wherein the second memory stores instructions that, when executed, cause the second processor to:
    process the first data using at least one of the ASR module and/or the NLU module;
    generate a natural language response based on at least a portion of the second data using the NLG module;
    generate a path rule including a sequence of at least one function based on the first data and the second data; and
    provide the natural language response and the path rule to the first processor, and
    wherein the first memory further stores instructions that, when executed, cause the first processor to:
    output at least a portion of the natural language response through the first speaker and/or through the display and the second speaker by executing the at least one function based on the path rule.

2. The electronic system of claim 1, wherein the instructions in the second memory cause the second processor to:
    generate a first natural language response when the second data indicates that an object is within a specified proximity of the proximity sensor.

3. The electronic system of claim 2, wherein the instructions in the first memory cause the first processor to:
    output at least a portion of the first natural language response through the first speaker during a turn-off state of the display.

4. The electronic system of claim 3, wherein the instructions in the first memory cause the first processor to:
    monitor third data provided by the proximity sensor; and
    output the at least a portion of the first natural language response using the first speaker and/or using the display and the second speaker, based on at least a portion of the third data.

5. An electronic device configured to support a speech recognition service, the electronic device comprising:
    a communication module comprising communication circuitry configured to communicate with an external device;
    a sensor module comprising sensing circuitry configured to sense a proximity of an object to the electronic device;
    a microphone configured to receive a voice input;
    a memory configured to store information associated with operation of the speech recognition service;
    a display configured to output a screen associated with execution of a function of the electronic device; and
    a processor electrically connected with the communication module, the sensor module, the microphone, the memory, and the display,
    wherein the processor is configured to:
    determine whether a user and the electronic device are within a specified proximity to each other using the sensor module;

control the electronic device to transmit, to the external device, voice input information and information on the proximity between the user and the electronic device;
control the electronic device to receive a path rule including a sequence of at least one action associated with the execution of the function of the electronic device corresponding to a recognition result from the external device based on voice input recognition of the external device;
control the electronic device to output at least one content associated with execution and/or processing of each of the at least one action based on the path rule, when the user and the electronic device are spaced apart from each other; and
control the electronic device to prevent at least a portion of the at least one content from being output when the user and the electronic device are within the specified proximity to each other.

6. The electronic device of claim 5, wherein the processor is configured to:
control the display to be turned off when it is determined that the user and the electronic device are within the specified proximity to each other; and
process a screen associated with the execution and/or the processing of each of the at least one action in a background of the display which is turned off.

7. The electronic device of claim 6, wherein the processor is configured to:
control the display, which is turned off, to be turned on, when a state between the electronic device and the user is changed from a proximity state, in which the user and the electronic device are within the specified proximity to each other, to a spacing state in which the user and the electronic device are spaced apart from each other; and
control the electronic device to output a screen associated with execution and/or processing of a final action of the at least one action.

8. The electronic device of claim 6, wherein the processor is configured to:
control the display, which is turned off, to be turned on, when a state between the electronic device and the user is changed from a proximity state, in which the user and the electronic device are within the specified proximity to each other, to a spacing state in which the user and the electronic device are spaced apart from each other; and
control the electronic device to output a screen associated with execution or processing of an action of the at least one action, which is executed at a time that the state between the electronic device and the user is changed to the spacing state.

9. The electronic device of claim 5, further comprising:
a hardware key disposed in one region of the electronic device,
wherein the processor is configured to:
control activation of the speech recognition service, based on the electronic device receiving a signal of an input applied to the hardware key.

10. The electronic device of claim 5, wherein the processor is configured to:
control the electronic device to receive voice response information associated with a specific action of the at least one action, from the external device; and
control the electronic device to output the voice response information at a time that the specific action is executed and/or completed, when a sound output function is provided in the electronic device.

11. The electronic device of claim 10, further comprising:
a receiver module comprising receiver circuitry disposed in a first region of the electronic device; and
a speaker disposed in a second region of the electronic device.

12. The electronic device of claim 11, wherein the processor is configured to:
control the electronic device to output the voice response information using the receiver module, when it is determined that the electronic device and the user are within the specified proximity to each other.

13. The electronic device of claim 11, wherein the processor is configured to:
control the electronic device to output the voice response information using the speaker, when it is determined that the electronic device and the user are spaced apart from each other.

14. The electronic device of claim 11, further comprising:
a hardware key disposed in a region of the electronic device,
wherein the processor is configured to:
control the electronic device to output specified voice information using the receiver module, when receiving a signal of an input applied to the hardware key, in a state that the sound output function is provided in the electronic device and the electronic device and the user are within the specified proximity to each other.

15. A method for operating a speech recognition service of an electronic device, the method comprising:
receiving a voice input;
determining whether the electronic device and a user are within a specified proximity to each other;
transmitting, to an external device which supports the operation of the speech recognition service, voice input information and information on the proximity between the user and the electronic device;
receiving a path rule including a sequence of at least one action associated with execution of a function of the electronic device corresponding to a recognition result of the voice input information from the external device;
outputting at least one content associated with execution or processing of each of the at least one action based on the path rule, when the electronic device and the user are spaced apart from each other; and
preventing at least a portion of the at least one content from being output when the electronic device and the user are within the specified proximity to each other.

16. The method of claim 15, wherein the preventing of the at least a portion of the at least one content includes:
controlling a display of the electronic device to be turned off when it is determined that the electronic device and the user are within the specified proximity to each other; and
processing a screen associated with the execution and/or the processing of each of the at least one action in background of the display which is turned off.

17. The method of claim 16, wherein the preventing of the at least a portion of the at least one content includes:
controlling the display, which is turned off, to be turned on, when a state between the electronic device and the user is changed from a proximity state, in which the user and the electronic device are within the specified proximity to each other, to a spacing state in which the user and the electronic device are spaced apart from each other; and outputting a screen associated with execution or processing of a final action of the at least one action.

18. The method of claim 16, wherein the preventing of the at least a portion of the at least one content includes:
controlling the display, which is turned off, to be turned on, when a state between the electronic device and the user is changed from a proximity state, in which the user and the electronic device are within the specified proximity to each other, to a spacing state in which the user and the electronic device are spaced apart from each other; and
outputting a screen associated with execution or processing of an action of the at least one action, which is executed at a time that the state between the electronic device and the user is changed to the spacing state.

19. The method of claim 15, wherein the receiving of the at least one action includes:
receiving voice response information associated with a specific action of the at least one action from the external device, and
wherein the preventing of the at least a portion of the at least one content includes:
outputting the voice response information at a time that the specific action is executed and/or completed, when a sound output function is provided in the electronic device.

20. The method of claim 19, wherein the outputting of the voice response information includes:
outputting the voice response information using a receiver module comprising receiver circuitry disposed in a first region of the electronic device, when the electronic device and the user are within the specified proximity to each other; and
outputting the voice response information using a speaker disposed in a second region of the electronic device, when the electronic device and the user are spaced apart from each other.

* * * * *